United States Patent
Shirakyan et al.

(10) Patent No.: US 10,052,766 B2
(45) Date of Patent: Aug. 21, 2018

(54) AUTOMATIC IN-SITU REGISTRATION AND CALIBRATION OF ROBOTIC ARM/SENSOR/WORKSPACE SYSTEM

(71) Applicant: Microsoft Technology Licensing, LLC, Redmond, WA (US)

(72) Inventors: Grigor Shirakyan, Kirkland, WA (US); Michael Revow, Bellevue, WA (US); Mihai Jalobeanu, Sammamish, WA (US); Bryan Joseph Thibodeau, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/937,061

(22) Filed: Nov. 10, 2015

(65) Prior Publication Data

US 2016/0059417 A1 Mar. 3, 2016

Related U.S. Application Data

(63) Continuation of application No. 14/314,970, filed on Jun. 25, 2014, now Pat. No. 9,211,643.

(51) Int. Cl.
*G06F 19/00* (2018.01)
*B25J 9/16* (2006.01)

(52) U.S. Cl.
CPC ........... *B25J 9/1692* (2013.01); *B25J 9/1674* (2013.01); *B25J 9/1694* (2013.01); *B25J 9/1697* (2013.01);
(Continued)

(58) Field of Classification Search
CPC ...... B25J 9/1674; B25J 9/1692; B25J 9/1694; B25J 9/1697; G05B 2219/39021; G05B 2219/39367; G05B 2219/40607
(Continued)

(56) References Cited

U.S. PATENT DOCUMENTS

| 7,509,177 | B2 | 3/2009 | Joublin et al. |
| 8,543,240 | B2 * | 9/2013 | Itkowitz ................... G06F 3/014 414/2 |

(Continued)

FOREIGN PATENT DOCUMENTS

| CN | 102087096 B | 6/2011 |
| CN | 103115615 A | 5/2013 |

OTHER PUBLICATIONS

"Written Opinion of the International Preliminary Examining Authority for PCT Patent Application No. PCT/US2015/036857", dated Jun. 24, 2016, 8 pages.
(Continued)

*Primary Examiner* — Ronnie M Mancho
(74) *Attorney, Agent, or Firm* — Medley, Behrens & Lewis, LLC

(57) ABSTRACT

Various technologies described herein pertain to automatic in-situ calibration and registration of a depth sensor and a robotic arm, where the depth sensor and the robotic arm operate in a workspace. The robotic arm can include an end effector. A non-parametric technique for registration between the depth sensor and the robotic arm can be implemented. The registration technique can utilize a sparse sampling of the workspace (e.g., collected during calibration or recalibration). A point cloud can be formed over calibration points and interpolation can be performed within the point cloud to map coordinates in a sensor coordinate frame to coordinates in an arm coordinate frame. Such technique can automatically incorporate intrinsic sensor parameters into transformations between the depth sensor and the robotic arm. Accordingly, an explicit model of intrinsics or biases of the depth sensor need not be utilized.

20 Claims, 10 Drawing Sheets

(52) U.S. Cl.
CPC ........... *G05B 2219/39016* (2013.01); *G05B 2219/39021* (2013.01); *G05B 2219/39022* (2013.01); *G05B 2219/39367* (2013.01); *G05B 2219/40607* (2013.01); *Y10S 901/09* (2013.01)

(58) Field of Classification Search
USPC ........ 700/245, 254, 250, 251; 901/2, 14, 16, 901/15, 27, 46, 30
See application file for complete search history.

(56) References Cited

U.S. PATENT DOCUMENTS

| | | | |
|---|---|---|---|
| 8,630,314 B2* | 1/2014 | York | H04J 3/0667 370/503 |
| 8,935,003 B2* | 1/2015 | Itkowitz | A61B 19/2203 700/245 |
| 8,996,173 B2* | 3/2015 | Itkowitz | A61B 19/2203 700/247 |
| 9,211,643 B1* | 12/2015 | Shirakyan | B25J 9/1697 |
| 9,316,743 B2* | 4/2016 | Rousso | G01T 1/1603 |
| 2009/0259412 A1* | 10/2009 | Brogardh | B25J 9/1633 702/41 |
| 2011/0280472 A1 | 11/2011 | Wallack et al. | |
| 2012/0098958 A1* | 4/2012 | Metzler | B25J 9/1697 348/95 |
| 2013/0226344 A1* | 8/2013 | Wong | G05D 1/024 700/258 |
| 2014/0375794 A1* | 12/2014 | Singh | B01J 19/121 348/95 |
| 2015/0019013 A1* | 1/2015 | Rose | G01L 1/16 700/258 |
| 2015/0065916 A1* | 3/2015 | Maguire | A61B 19/2203 600/573 |

OTHER PUBLICATIONS

"Response to the International Search Report and Written Opinion for PCT Patent Application No. PCT/US2015/036857", dated Mar. 18, 2016, 13 pages.
Hu, et al., "Automatic Calibration of Hand-Eye-Workspace and Camera Using Hand-Mounted Line Laser", Retrieved at: «http://ieeexplore.ieee.org/xpl/login.jsp?tp=&arnumber=6294447 &punumber=3516&url=http%3A%2F%2Fieeexplore.ieee.org%2Fiel5%2F3516%2F4785241%2F06294447.pdf», In IEEE/ASME Transactions on Mechatronics, vol. 18, Issue 6, Dec. 2013, 9 pages.
Wei, et al., "Active Self-calibration of Robotic Eyes and Hand-eye Relationships with Model Identification", Retrieved at: «http://citeseerx.ist.psu.edu/viewdoc/download?doi=10.1.1.56.5151 &rep=rep1&type=pdf», In IEEE Transaction on Robotics and Automation, vol. 14, Issue 1, Feb. 1998, 19 pages.
Su, et al, "Calibration-Free Robotic Eye-Hand Coordination Based on an Auto Disturbance-Rejection Controller", Retrieved at: «http://rcir.sjtu.edu.cn/~jbsu/papers/CalibrationFreeRoboticEyeHandCoordinationBas.pdf», In IEEE Transactions on Robotics, vol. 20, Issue 5, Oct. 2004, 9 pages.
Birbach, et al., "Automatic and Self-Contained Calibration of a Multi-Sensorial Humanoid's Upper Body", Retrieved at: «http://elib.dlr.de/76336/1/Birbach2012.pdf», In IEEE International Conference on Robotics and Automation, May 14, 2012, 6 pages.
Bennett, et al., "Autonomous Robot Calibration for Hand-Eye Coordination", Retrieved at: «https://www.cs.utah.edu/~jmh/Papers/Bennett_IJRR91.pdf», In the International Journal of Robotics Research, vol. 10 Issue 5, Oct. 1991, 11 pages.
Heng, et al., "CamOdoCal: Automatic Intrinsic and Extrinsic Calibration of a Rig with Multiple Generic Cameras and Odometry", Retrieved at: «http://www.inf.ethz.ch/personal/hengli/papers/camodocal_iros2013.pdf», In IEEE/RSJ International Conference on Intelligent Robots and Systems, Jul. 18, 2013, 8 pages.
Tsai, et al., "Real Time Versatile Robotics Hand/Eye Calibration using 3D Machine Vision", Retrieved at: «http://ieeexplore.ieee.org/xpl/login.jsp?tp=&arnumber=12110 &url=http%3A%2F%2Fieeexplore.ieee.org%2Fxpls%2Fabs_all.jsp%3Farnumber%3D12110», In IEEE International Conference on Robotics and Automation, Apr. 24, 1998, 8 pages.
"Hand-Eye Calibration", Retrieved at: «http://campar.in.tum.de/Chair/HandEyeCalibration#Robot_Camera_Calibration_also_Tr», Retrieval date: Jan. 3, 2014, 4 Pages.
Tsai, et al., "A New Technique for Fully Autonomous and Efficient 3D Robotics Hand/Eye Calibration", Retrieved at: «http://www-old.me.gatech.edu/me6406/handeye.pdf», In the IEEE Transactions on Robotics and Automation, vol. 5, Issue 3, Jun. 1989, 14 pages.
Fiedler, et al., "Impact of Thermal and Environmental Conditions on the Kinect Sensor", Retrieved at: «http://cvpr.uni-muenster.de/WDIA2012/scientific_program/Paper-Fiedler.pdf», In Proc. Int. Workshop on Depth Image Analysis, 2012, 8 pages.
Goodall, Colin, "Procrustes Methods in the Statistical Analysis of Shape", Retrieved at: «http://docencia.med.uchile.cl/smg/pdf/GODALL1991.pdf», In Journal of the Royal Statistical Society, Series B (Methodological), vol. 53, Issue 2, 1991, 55 pages.
Gower, J.C., "Generalized Procrustes Analysis", In Psychometrika, vol. 40, Issue 1, Mar. 1975, 19 pages.
Herrera, et al., "Accurate and Practical Calibration of a Depth and Color Camera Pair", Retrieved at: «http://www.ee.oulu.fi/~dherrera/papers/2011-depth_calibration.pdf», In Computer Analysis of Images and Patterns, 2011, 8 pages.
Horaud, et al., "Hand-Eye Calibration", Retrieved at: «http://citeseerx.ist.psu.edu/viewdoc/download?doi=10.1.1.143.5469 &rep=rep1&type=pdf», In The International Journal of Robotics Research, vol. 14, Issue 3, Jun. 1995, 29 pages.
Ivaldi, et al., "Perception and Human Interaction for Developmental Learning of Objects and Affordances", Retrieved at: «http://hal-ensta.archives-ouvertes.fr/docs/00/75/52/97/PDF/2012ACTI2527.pdf», In Proc. of the 12th IEEE-RAS International Conference on Humanoid Robots—HUMANOIDS, Version 1, Nov. 21, 2012, 7 pages.
Krainin, et al., "Manipulator and Object Tracking for In-Hand 3D Object Modeling", Retrieved at: «http://homes.cs.washington.edu/~xren/publication/krainin-IJRR2011-in-hand-object-modeling.pdf», In The International Journal of Robotics Research, vol. 30, Issue 11, 2011, 17 pages.
Le, et al., "Joint Calibration of Multiple Sensors", Retrieved at: «http://www-robotics.stanford.edu/~ang/papers/iros09-JointCalibrationMultipleSensors.pdf», In Intelligent Robots and Systems, 2009, 8 pages.
Tsai, "A Versatile Camera Calibration Technique for High-Accuracy 3D Machine Vision Metrology Using Off-the-Shelf TV Cameras and Lenses", Retrieved at: «http://www4.cs.umanitoba.ca/~jacky/Robotics/Papers/tsai_calibration.pdf>, vol. 3, Issue 4, Aug. 1987, 22 pages.
Yii, et al., "Visual Localisation of a Robot with an External RGBD Sensor", In Proceedings of the Australian Conference on Robotics and Automation, 2011, 9 pages.
Zhang, "A Flexible New Technique for Camera Calibration", Retrieved at: «http://cgit.nutn.edu.tw:8080/cgit/PaperDL/WWD_090312161102.pdf», In Pattern Analysis and Machine Intelligence, vol. 22, Issue 11, 2000, 5 pages.
Malzahn, et al., "A Multi-Link-Flexible Robot Arm Catching Thrown Balls", Proceedings of ROBOTIK 2012; 7th German Conference on Robotics, 2012, 6 pages.
"Notice of Allowance and Fees Due for U.S. Appl. No. 14/314,970", dated Aug. 17, 2015, 29 pages.
"International Search Report and Written Opinion for PCT Patent Application No. PCT/US2015/036857", dated Dec. 4, 2015, 13 pages.
Wang, et al., "Improving Position Accuracy of Robot Manipulators Using Neural Networks", Instrument and Measurement Technology Conference, May 17, 2005, pp. 1524-1526.
"International Preliminary Report on Patentability for PCT Patent Application No. PCT/US2015/036857", dated Oct. 17, 2016, 18 pages.

(56) References Cited

OTHER PUBLICATIONS

"Communication Pursuant to Rules 161(1) and 162 EPC for European Patent Application No. 15736346.6", dated Feb. 1, 2017, 2 pages.

"Response to Communication Pursuant to Rules 161(1) and 162 EPC for European Patent Application No. 15736346.6", Filed Date: Aug. 1, 2017, 24 pages.

* cited by examiner

AUTOMATIC IN-SITU REGISTRATION AND CALIBRATION OF ROBOTIC ARM/SENSOR/WORKSPACE SYSTEM

CROSS-REFERENCE TO RELATED APPLICATION

This application is a continuation of U.S. patent application Ser. No. 14/314,970, filed on Jun. 25, 2014, and entitled "AUTOMATIC IN-SITU REGISTRATION AND CALIBRATION OF ROBOTIC ARM/SENSOR/WORKSPACE SYSTEM", the entirety of which is incorporated herein by reference.

BACKGROUND

Manipulation of objects can be a function of a wide class of robotic systems (e.g., manipulation systems). For instance, a typical closed-loop manipulation system can include at least one optical sensor (e.g., depth sensor) that perceives and interprets real-world scenes and a physical manipulator (e.g., actuator, robotic arm, etc.) that can reach into the scenes and effect change (e.g., pick up and move a physical object). An ability to perform useful tasks with a physical object can depend on the ability of the robotic arm to manipulate the object with sufficient accuracy for the task. The accuracy can depend on a mapping between a coordinate system of the depth sensor and a coordinate system of the robotic arm. For instance, a mapping can be created between coordinates extracted from a depth image generated by a depth sensor and Cartesian positions of a robotic arm in a workspace. Such mapping between coordinate systems can also be referred to as registration. Precise and accurate mapping between depth sensors and robotic arms is a long-standing challenge in robotics and is relevant for substantially any robotic system that has one or more depth sensors. Errors in the mapping can result in inaccuracies of the overall manipulation system.

Several independent sources of registration errors can each contribute to overall system inaccuracy. In a typical naïve setup, a Cartesian coordinate system oftentimes is chosen to represent the real world, and coordinates of the robotic arm and the depth sensor in that system are determined by measurements. A linear function (e.g., commonly represented as a transformation matrix) can then transform coordinates of objects as seen by the depth sensor to coordinates of the world (or coordinates of the robotic arm). Such a typical model can have a number of potential error sources. According to an example, errors can result from measuring exact placement of the depth sensor and the robotic arm in a common coordinate frame, which can be difficult at best. Further, the overall system may be prone to falling out of calibration due to mechanical movement of parts within the system. According to another example, while coordinate origins may be determined automatically, linear mapping between reference frames of the robotic arm, the depth sensor, and the world oftentimes can be incorrect. For instance, a depth sensor may have a bias that varies non-linearly with distance or across sensor areas. According to yet another example, a robotic arm can have less than ideal ability to achieve exact placement of an end effector of such robotic arm at a desired Cartesian coordinate. Further, depth sensors or robotic arms, even those from the same vendor, may have slightly different biases, which can further complicate typical approaches for registration.

SUMMARY

Described herein are various technologies that pertain to automatic in-situ calibration and registration of a depth sensor and a robotic arm, where the depth sensor and the robotic arm operate in a workspace. The robotic arm can include an end effector. A non-parametric technique for registration between the depth sensor and the robotic arm can be implemented. The registration technique can utilize a sparse sampling of the workspace (e.g., collected during calibration or recalibration). A point cloud can be formed over calibration points and interpolation can be performed within the point cloud to map coordinates in a sensor coordinate frame to coordinates in an arm coordinate frame. Such technique can automatically incorporate intrinsic sensor parameters into transformations between the depth sensor and the robotic arm. Accordingly, an explicit model of intrinsics or biases of the depth sensor need not be utilized.

In accordance with various embodiments, the depth sensor and the robotic arm can be controlled (e.g., during registration, by a control system, etc.). For instance, an input point from the depth sensor can be received. The input point can include coordinates indicative of a location in a sensor coordinate frame, where the location is in the workspace. Sensor calibration points within proximity of the input point can be identified. A sensor calibration point can include first coordinates of the end effector in the sensor coordinate frame, where the first coordinates are previously collected during calibration (e.g., recalibration) with the end effector at a given position within the workspace. Moreover, arm calibration points that respectively correspond to the sensor calibration points can be identified. An arm calibration point that corresponds to the sensor calibration point can include second coordinates of the end effector in an arm coordinate frame, where the second coordinates are previously collected during the calibration (e.g., recalibration) with the end effector at the given position within the workspace. Further, a processor can be employed to compute an estimated point that maps to the input point. The estimated point can include coordinates indicative of the location in the arm coordinate frame. The estimated point can be computed based upon the sensor calibration points and the arm calibration points as identified. According to various embodiments, it is contemplated that the techniques described herein can similarly enable computing an estimated point, which includes coordinates in the sensor coordinate frame, that maps to an input point, which includes coordinates in the arm coordinate frame.

In accordance with various embodiments, calibration (e.g., recalibration) of the depth sensor and the robotic arm can be performed. During calibration (e.g., recalibration), the end effector can be caused to non-continuously traverse through the workspace based upon a pattern, where the end effector is stopped at positions within the workspace according to the pattern. At each position from the positions within the workspace at which the end effector is stopped, a sensor calibration point for the position of the end effector within the workspace detected by the depth sensor can be collected and an arm calibration point for the position of the end effector within the workspace detected by the robotic arm can be collected. The depth sensor and the robotic arm can be recalibrated, for instance, responsive to movement of the depth sensor in the workspace, movement of the robotic arm in the workspace, a temperature change in the workspace that exceeds a threshold temperature value, a mapping error detected that exceeds a threshold error value, or the like.

The above summary presents a simplified summary in order to provide a basic understanding of some aspects of the systems and/or methods discussed herein. This summary is not an extensive overview of the systems and/or methods discussed herein. It is not intended to identify key/critical

DETAILED DESCRIPTION

Figure 1:
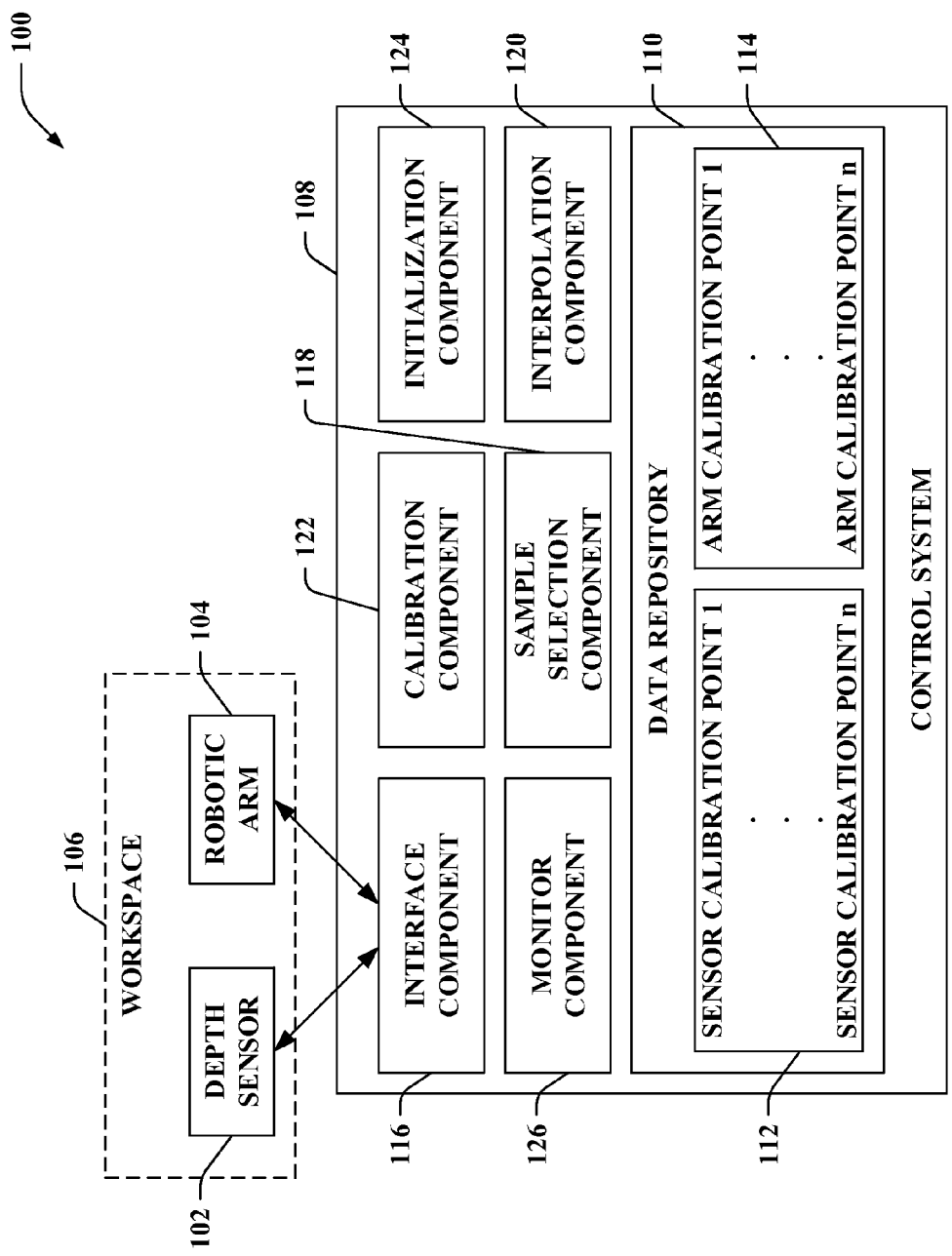
FIG. 1 illustrates a functional block diagram of an exemplary system that that controls a depth sensor and a robotic arm that operate in a workspace.

Various technologies pertaining to automatic in-situ calibration and registration of a depth sensor and a robotic arm, where the depth sensor and the robotic arm operate in a workspace, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, a non-parametric technique for registration between a depth sensor and a robotic arm can be implemented. The registration technique can utilize a sparse sampling of a workspace (e.g., with a marker placed on an end effector of the robotic arm). A point cloud can be formed over calibration points and interpolation can be performed within the point cloud to map coordinates in a sensor coordinate frame to coordinates in an arm coordinate frame. Such techniques can automatically incorporate intrinsic sensor parameters into transformations between the depth sensor and the robotic arm. Accordingly, an explicit model of intrinsics or biases of the depth sensor need not be utilized. A result of the registration described herein can be used to generate reaching motions with the robotic arm towards targets sensed by the depth sensor. For instance, the Euclidean error in the resulting transformation from coordinates of the depth sensor to coordinates of the robotic arm can be on the order of sub-millimeters or millimeters; however, the claimed subject matter is not so limited.

Techniques set forth herein can automatically generate a coordinate frame transformation function for mapping coordinates between a sensor coordinate frame and an arm coordinate frame. The transformation function can be a non-linear function that can account for non-linear characteristics of the depth sensor and/or the robotic arm. For instance, the transformation function can be a closed form function, a collection of closed form functions, described using a lookup table or a neural net, or the like.

Referring now to the drawings, FIG. 1 illustrates a system 100 that controls a depth sensor 102 and a robotic arm 104 that operate in a workspace 106. The robotic arm 104 can include an end effector. Moreover, the system 100 includes a control system 108. The control system 108 can control the depth sensor 102 and the robotic arm 104; more particularly, the control system 108 can automatically control in-situ calibration and registration of the depth sensor 102 and the robotic arm 104 in the workspace 106.

The control system 108 can create a mapping between coordinates extracted from a depth image generated by the depth sensor 102 and a corresponding Cartesian position of the robotic arm 104 (e.g., a position of the end effector of the robotic arm 104) in the workspace 106. Coordinates extracted from a depth image generated by the depth sensor 102 can be referred to herein as coordinates in a sensor coordinate frame (e.g., sensor coordinates in the sensor coordinate frame). Moreover, a Cartesian position of the robotic arm 104 in the workspace 106 can be referred to herein as coordinates in an arm coordinate frame (e.g., arm coordinates in the arm coordinate frame).

The control system 108 can compute a transformation between sensor coordinates in the sensor coordinate frame from the depth sensor 102 and arm coordinates in an arm coordinate frame from the robotic arm 104, while simultaneously compensating for distortions in a depth field of the depth sensor 102. The transformation of coordinates in the sensor coordinate frame to coordinates in the arm coordinate frame allows for generation of Cartesian position goals for the robotic arm 104 to perform a reaching motion towards a target identified in the depth image by the depth sensor 102. Moreover, it is contemplated that coordinates in the arm coordinate frame can be transformed to coordinates in the sensor coordinate frame by the control system 108. Thus, the control system 108 simultaneously calibrates the depth sensor 102 (e.g., compensates for distortions in the depth field) and computes the transformation between sensor coordinates from the depth sensor 102 and arm coordinates from the robotic arm 104. Such simultaneous calibration and computation of the transformation enables accurate coordination between the depth sensor 102 and the robotic arm 104 when performing subsequent tasks.

Pursuant to various embodiments, the control system 108 can transmit data to and receive data from the depth sensor 102 and the robotic arm 104 over a network (or networks). For example, the depth sensor 102, the robotic arm 104, and the control system 108 can each be connected to a local network (over which data can be transmitted). According to another example, it is contemplated that the control system 108 can be executed by one or more processors of one or more server computing devices (e.g., one or more datacenters can include the control system 108, etc.). In accordance with yet another example, it is to be appreciated that the control system 108 can be part of the depth sensor 102 and/or the robotic arm 104.

The control system 108 can enable automatic discovery of a coordinate transformation function that compensates for non-linear biases of the depth sensor 102 and the robotic arm 104. Such coordinate transformation function can be discovered by the control system 108 without separate pre-calibration of the depth sensor 102. The coordinate transformation function can account for non-linear biases of the robotic arm 104 (e.g., characteristics of the robotic arm 104 can change over time, when an end effector is placed at differing locations in the workspace 106 due to mechanical deformation of the robotic arm 104, etc.).

The depth sensor 102 can be substantially any type of depth sensor. For example, the depth sensor 102 can be a structured light three-dimensional (3D) scanner, a time-of-flight scanner, a modulated light 3D scanner, or the like.

According to an example, if a scene captured by the depth sensor 102 (e.g., a time-of-flight scanner) lacks highly infrared (IR) reflective, shiny, or absorbent surfaces, then mean depth readings at a particular pixel provided by the depth sensor 102 can be stable in time, displaying small variance. Thus, depth readings from the depth sensor 102 can be stable over a number of readings and can have a high degree of precision over much of the scene, provided sampling occurs over enough frames. By way of another example, a systematic distortion of the depth field may be present for the depth sensor 102. The low-frequency bias patterns can reach several centimeters at sides of the depth image and several millimeters in the middle of the depth image. Biases and placement errors are commonly repeatable for a given device, and thus, can potentially be minimized with a non-uniform mapping function. The distortion can change shape at different distances, which suggests a relatively complex non-linear bias model. The control system 108 can account for the distortion to achieve millimeter or sub-millimeter levels of accuracy. Rather than trying to separately model the distortion, the control system 108 automatically compensates for the distortion during a transformation of coordinates between the sensor coordinate frame and the arm coordinate frame.

The control system 108 can include a data repository 110. The data repository 110 can include sensor calibration points 112 and arm calibration points 114. The sensor calibration points 112 can include a sensor calibration point 1, . . . , and a sensor calibration point n, where n can be substantially any integer. Moreover, the arm calibration points 114 can include an arm calibration point 1, . . . , and an arm calibration point n. The arm calibration points 114 respectively correspond to the sensor calibration points 112. As described in greater detail below, the control system 108 can include a calibration component 122 that can collect and store (e.g., in the data repository 110) the sensor calibration points 112 and the arm calibration points 114.

A sensor calibration point (e.g., from the sensor calibration points 112) includes first coordinates of the end effector of the robotic arm 104 in the sensor coordinate frame. The first coordinates are previously collected (e.g., by the calibration component 122) during calibration with the end effector at a given position within the workspace 106. Moreover, an arm calibration point (e.g., from the arm calibration points 114) that corresponds to the sensor calibration point includes second coordinates of the end effector of the robotic arm 104 in the arm coordinate frame. The second coordinates are previously collected during the calibration (e.g., by the calibration component 122) with the end effector at the given position within the workspace 106. Thus, the sensor calibration points 112 and the corresponding arm calibration points 114 are collected for a plurality of positions throughout the workspace 106. A number and placement of the positions throughout the workspace 106 can be predetermined (e.g., based upon a pre-determined placement grid) or actively identified (e.g., based upon where a larger mapping error is measured or expected).

The control system 108 can include an interface component 116. The interface component 116, for example, can receive an input point from the depth sensor 102. The input point can include coordinates indicative of a location in the sensor coordinate frame, where the location is in the workspace 106. Continued reference is made below to the example where the interface component 116 receives the input point from the depth sensor 102, and such input point is mapped to an estimated point in the arm coordinate frame. However, it is contemplated that the interface component 116 can additionally or alternatively receive an input point from the robotic arm 104. Accordingly, the input point from the robotic arm 104 can include coordinates indicative of a location in the arm coordinate frame, where such location is in the workspace 106. Thus, much of the below discussion can be extended to the example where the interface component 116 receives the input point from the robotic arm 104, where such input point can be mapped to an estimated point in the sensor coordinated frame.

The control system 108 can further include a sample selection component 118. The sample selection component 118 can identify sensor calibration points within proximity of the input point from the data repository 110. Thus, the sample selection component 118 can identify a subset (less than n) of the sensor calibration points 112 from the data repository 110 as being within proximity of the input point. Moreover, the sample selection component 118 can identify arm calibration points that respectively correspond to the sensor calibration points within proximity of the input point from the data repository 110. Accordingly, the sample selection component 118 can identify a subset (less than n) of the arm calibration points 114 from the data repository 110 that respectively correspond to the sensor calibration points within proximity of the input point.

Moreover, the control system 108 can include an interpolation component 120 that computes an estimated point that maps to the input point. The estimated point can include coordinates indicative of the location in the arm coordinate frame. Thus, the input point received by the interface component 116 can include coordinates indicative of the location in the sensor coordinate frame and the estimated point computed by the interpolation component 120 can include coordinates indicative of the location in the arm coordinate frame, where the location is in the workspace

106. The estimated point can be computed by the interpolation component 120 based upon the sensor calibration points within proximity of the input point and the arm calibration points that respectively correspond to the sensor calibration points within proximity of the input point.

As noted above, the control system 108 can include the calibration component 122 that performs the calibration of the depth sensor 102 and the robotic arm 104. The calibration component 122 can perform in-situ calibration or recalibration of the depth sensor 102 and the robotic arm 104 in the workspace 106. The calibration component 122 can cause the end effector of the robotic arm 104 to non-continuously traverse through the workspace 106 based on a pattern. The end effector can be stopped at positions within the workspace 106 according to the pattern.

The calibration component 122, at each position from the positions within the workspace 106 at which the end effector is stopped, can collect a sensor calibration point for the position of the end effector within the workspace 106 detected by the depth sensor 102 and an arm calibration point for the position of the end effector within the workspace 106 detected by the robotic arm 104. The sensor calibration point for the position can include coordinates of the end effector at the position within the workspace 106 in the sensor coordinate frame. According to an example, the coordinates of the end effector included as part of the sensor calibration point can be coordinates of a centroid (e.g., of a given portion of the end effector, of an object mechanically attached to the end effector, etc.), where the centroid can be computed based on image moments of a standard deviation image from the depth sensor 102. Moreover, the arm calibration point for the position can include coordinates of the end effector at the position within the workspace 106 in the arm coordinate frame. Further, the calibration component 122 can store the sensor calibration point and the arm calibration point for the position in the data repository 110 (e.g., as part of the sensor calibration points 112 and the arm calibration points 114, respectively).

Figure 2:
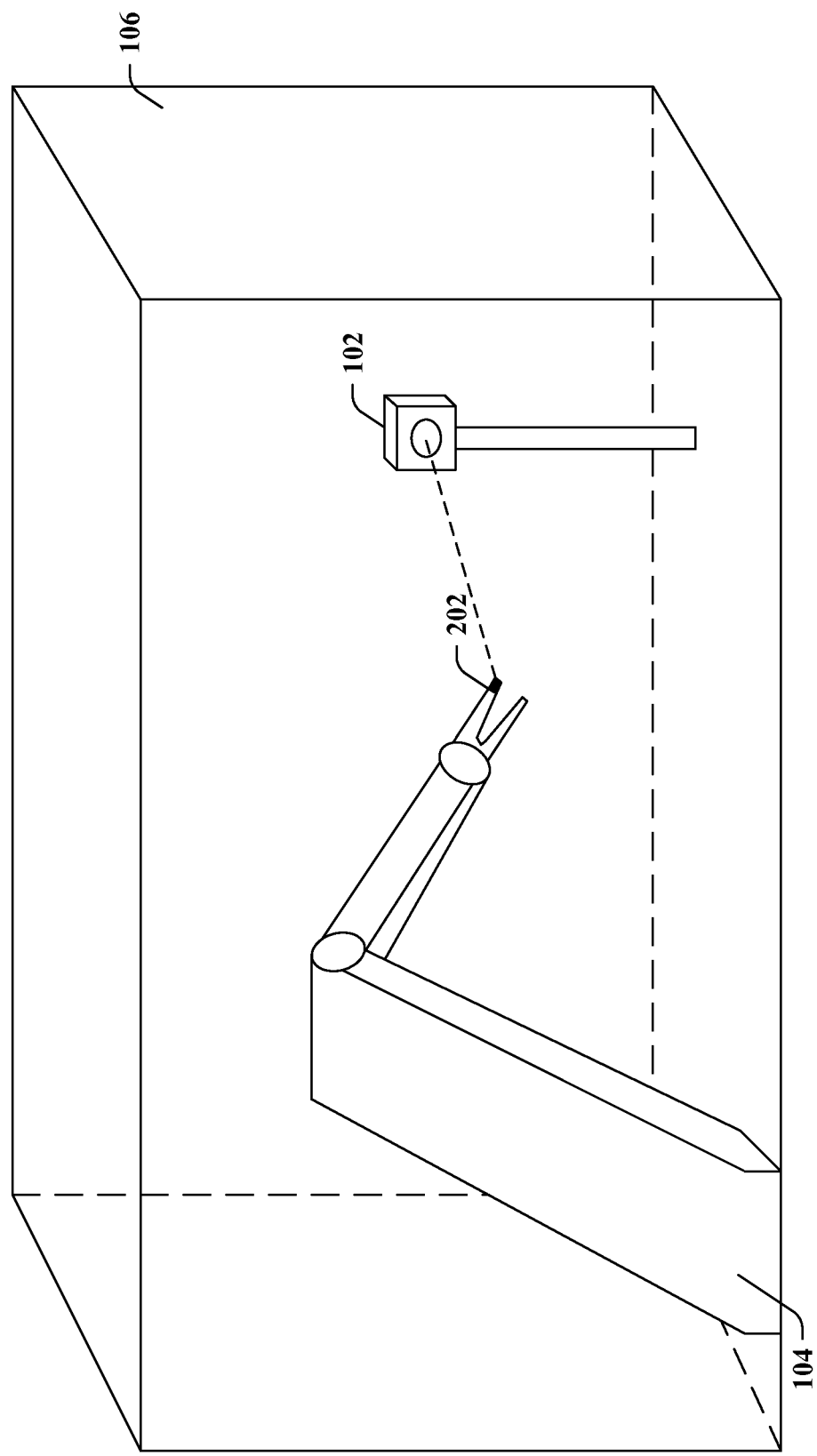
FIG. 2 illustrates an example of the workspace of FIG. 1.

Turning to FIG. 2, illustrated is an example of the workspace 106. The depth sensor 102 and the robotic arm 104 operate in the workspace 106. The robotic arm 104 can include an end effector 202.

During calibration (e.g., recalibration) of the depth sensor 102 and the robotic arm 104, the end effector 202 can be caused to non-continuously traverse through the workspace 106 based on a pattern, where the end effector 202 is stopped at positions within the workspace 106 according to the pattern. For example, the end effector 202 of the robotic arm 104 can be placed at regular intervals in the workspace 106. However, other patterns are intended to fall within the scope of the hereto appended claims (e.g., interval size can be a function of measured mapping error for a given volume in the workspace 106, differing preset intervals can be set in the pattern for a given type of depth sensor, etc.). Further, the depth sensor 102 can detect coordinates of a position of the end effector 202 (e.g., a calibration target on the end effector 202) in the workspace 106 in the sensor coordinate frame, while the robotic arm 104 can detect coordinates of the position of the end effector 202 (e.g., the calibration target) in the workspace 106 in the arm coordinate frame. Thus, pairs of corresponding points in the sensor coordinate frame and the arm coordinate frame can be captured when the depth sensor 102 and the robotic arm 104 are calibrated (e.g., recalibrated).

Figure 3:
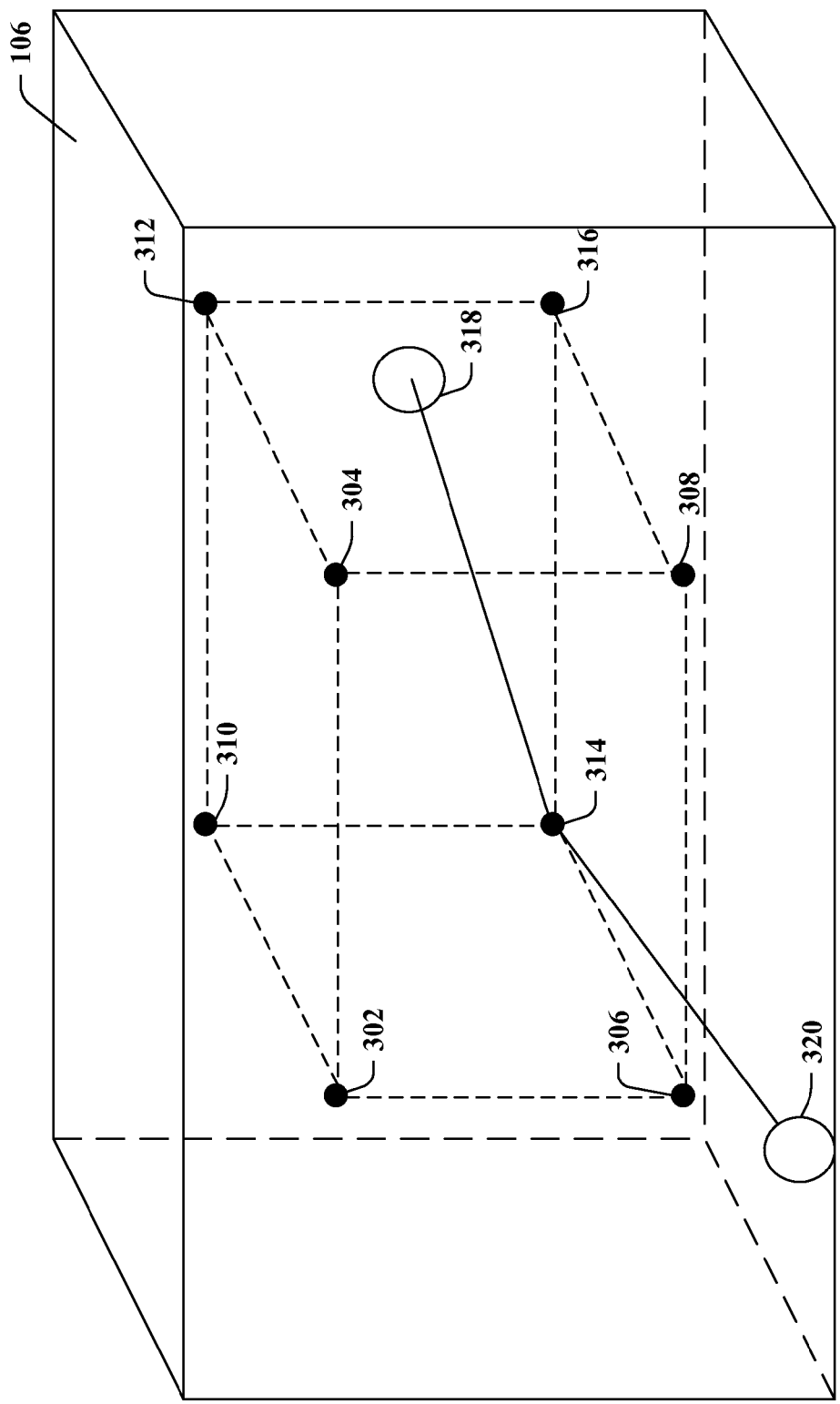
FIG. 3 illustrates an exemplary pattern used for calibration (e.g., recalibration) that specifies positions within the workspace of FIG. 2.

FIG. 3 shows an exemplary pattern used for calibration (e.g., recalibration) that specifies positions within the workspace 106. The end effector 202 of the robotic arm 104 can be caused to traverse through the workspace 106 based upon the pattern, stopping at positions 302-316 shown in FIG. 3. The end effector 202 can follow substantially any path between the positions 302-316 specified by the pattern when traversing through the workspace 106.

As depicted, the robotic arm 104 can be caused to stop the end effector 202 of the robotic arm 104 at eight positions 302-316 in the volume of the workspace 106; however, it is contemplated that the claimed subject matter is not limited to the depicted example, as the pattern shown is provided for illustration purposes. For instance, the end effector 202 of the robotic arm 104 can be stopped at substantially any number of positions within the volume of the workspace 106, the positions within the volume of the workspace 106 need not be equally spaced, and so forth.

The number and placement of the positions 302-316 can be predetermined (e.g., based upon a pre-determined placement grid) or actively identified (e.g., based upon where a larger mapping error is measured or expected). For instance, volumes within the workspace 106 that have (or are expected to have) lower mapping errors can be sparsely sampled, while volumes within the workspace 106 that have (or are expected to have) higher mapping errors can be more densely sampled. The foregoing can reduce an amount of time for performing calibration, while enhancing accuracy of a resulting transformation function.

The depth sensor 102 (represented by circle 318) and the robotic arm 104 (represented by circle 320) can detect respective coordinates of the end effector 202 of the robotic arm 104 at each of the positions 302-316. For instance, when the end effector 202 is stopped at the position 314, the depth sensor 102 can detect a sensor calibration point for the position 314 of the end effector 202 within the workspace 106 and the robotic arm 104 can detect an arm calibration point for the position 314 of the end effector 202 within the workspace 106. The sensor calibration point for the position 314 includes first coordinates of the end effector 202 in the sensor coordinate frame, and the arm calibration point for the position 314 includes second coordinates of the end effector 202 in the arm coordinate frame.

Again, reference is made to FIG. 1. The calibration component 122 can cause the end effector of the robotic arm 104 to be placed at the positions as specified by the pattern. At each of the positions in the workspace 106, a pair of corresponding points (e.g., a sensor calibration point and an arm calibration point) in the sensor coordinate frame and the arm coordinate frame can be collected, $(p_c, p_a) = (\{x_c, y_c, z_c\}, \{x_a, y_a, z_a\})$. Let n be the number of point pairs collected and $P_c = (p_{c1}, \ldots, p_{cn})$ and $P_a = (p_{a1}, \ldots, p_{an})$ be the sets of coordinates collected in the sensor coordinate frame and the arm coordinate frame respectively (e.g., $P_c$ can be the sensor calibration points 112 and $P_a$ can be the arm calibration points 114).

To collect the calibration data $(P_c, P_a)$, the depth sensor 102 can be placed in a fixed location with a relevant portion of the workspace 106 (e.g., the portion in which the robotic arm 104 operates) in view. The depth sensor 102 can have an unobstructed view of the workspace 106 within the range of the depth sensor 102. It is to be appreciated that other restrictions on the placement of the depth sensor 102 need not be employed, though a marker on the end effector can be oriented in a general direction of the depth sensor 102. The robotic arm 104 can be equipped with a calibration marker attached to the end effector that allows precise localization of the end effector in 3D space of the depth sensor 102. Moreover, it is contemplated that substantially any technique can be used by the depth sensor 102 to estimate coordinates of the end effector in the sensor coordinate frame, as long as such technique provides sufficiently precise results. An example of such a technique employed by the depth sensor 102 to estimate coordinates of the end effector in the sensor coordinate frame which provides sub-millimeter precision is described below; yet, is it contemplated that the claimed subject matter is not so limited as other techniques can additionally or alternatively be utilized.

According to an example, a plurality of markers can be attached to the end effector of the robotic arm 104. Following this example, several calibration point pairs can be collected at each position in the workspace 106. By way of illustration, a fork that is attachable to the end effector of the robotic arm 104 can include spatially separated teeth, and an end of each tooth can include or be mechanically attached to a marker. The plurality of markers can be oriented in a row, a rectangle, or substantially any pattern so long as parameters of the pattern are known. Use of a plurality of markers can reduce an amount of time for sampling the volume of the workspace 106.

During calibration, the calibration component 122 can cause the robotic arm 104 to move the end effector through the workspace 106 in a regular pattern, stopping at each of the positions specified by the pattern for a duration of time to allow the depth sensor 102 to collect depth samples (e.g., the sensor calibration points 112). At each point i, $p_{ci}$ can be computed based on segmentation of the end effector tip in the sensor coordinate frame, and $p_{ai}$ can be computed based on a forward kinematic model of the robotic arm 104.

According to an example, to construct $(P_c, P_a)$, a desired workspace (e.g., the workspace 106) of the robotic arm 104 can be contained within a convex hull of $P_a$. In general, a denser set of points can provide a more accurate transformation. However, given a fixed volume, an amount of time it takes to traverse the sample points (e.g., the positions specified by the pattern) is inversely proportional to the cube of the distance between points. According to an example, a larger number of sample points can be collected (e.g., during calibration or recalibration) in a volume of the workspace 106 that has a larger mapping error relative to a disparate volume of the workspace 106; yet, the claimed subject matter is not so limited. Once calibration data has been captured by the calibration component 122, the target can be removed from the end effector (if utilized) and replaced with a task appropriate tool.

The control system 108 can further include an initialization component 124 that can initialize the depth sensor 102 and the robotic arm 104 by employing global Procrustes analysis. The initialization component 124 can match two shapes in different coordinate frames, possibly with different scales, utilizing Procrustes analysis. The initialization component 124 can utilize two sets of points X and Y as input for the Procrustes analysis. Further, the initialization component 124 can determine a translation, scaling, and rotation operation that, when applied to points in Y, minimize a sum of the squared distances to the points in X.

The initialization component 124 enables mapping between the sensor coordinate frame and the arm coordinate frame by performing Procrustes analysis using the entire sets $P_c$ and $P_a$. Once the transformation is computed, the initialization component 124 can estimate coordinates in the arm coordinate space for any 3D point in the sensor coordinate space, or vice versa. This technique can be simple to implement, and once the transformation is computed, it can be applied to any point in $P_c$. However, such approach may not account for local distortions in the depth field.

The initialization component 124 can provide a rough approximation of registration configuration for the depth sensor 102 and the robotic arm 104. By way of example, when the depth sensor 102 and the robotic arm 104 are initialized in the workspace 106, the initialization component 124 can generate the rough approximation of the registration configuration. Following this example, the calibration component 122 can thereafter cause additional sampling of the workspace 106 as described herein (e.g., the rough approximation of the registration configuration can be used during at least part of the additional sampling of the workspace 106); yet, the claimed subject matter is not so limited.

The control system 108 can further include a monitor component 126 that monitors conditions of the depth sensor 102, the robotic arm 104, and the workspace 106. The calibration component 122 can selectively initiate recalibration based upon a condition as detected by the monitor component 126. Examples of conditions that can be monitored by the monitor component 126 include movement of the depth sensor 102 in the workspace 106, movement of the robotic arm 104 in the workspace 106, a temperature change in the workspace 106 exceeding a threshold temperature value, a mapping error exceeding a threshold error value, a combination thereof, or the like. For example, responsive to the monitor component 126 detecting the movement of the depth sensor 102 in the workspace 106, the movement of the robotic arm 104 in the workspace 106, the temperature change in the workspace that exceeds the threshold temperature value, the mapping error that exceeds the threshold error value, etc., the calibration component 122 can recalibrate the depth sensor 102 and the robotic arm 104. It is contemplated that the monitor component 126 can monitor a subset of the above-noted conditions and/or other conditions can be monitored by the monitor component 126.

By way of illustration, a vision-guided manipulation system (e.g., the depth sensor 102 and the robotic arm 104) deployed in the workspace 106 may fall out of initial calibration due to a number of factors (e.g., intentional and unintentional moving of equipment, temperature changes, etc.). The monitor component 126 and the recalibration component 122 allow for recalibration to be performed on-demand and on-site. Moreover, the monitor component 126 can verify the calibration (e.g., periodically, prior to a task to be performed by the depth sensor 102 and the robotic arm 104, etc.). Verification can be performed by placing a known object at a few known locations in the workspace 106 with the robotic arm 104, and observing the known object with the depth sensor 102. If the monitor component 126 detects a mapping error above the threshold error value, the monitor component 126 can cause the calibration component 122 to recalibrate (e.g., until the mapping error is below the threshold error value, etc.).

Recalibration performed by the calibration component 122, for instance, can include causing the end effector to non-continuously traverse through the workspace 106 based upon a pattern, where the end effector is stopped at positions within the workspace 106 according to the pattern. It is to be appreciated that the pattern used for recalibration can be substantially similar to or differ from a previously used pattern (e.g., a pattern used for calibration, a pattern used for prior recalibration, etc.). According to an example, a pattern used for recalibration can allow for sampling a portion of the workspace 106, whereas a previously used pattern allowed for sampling across the workspace 106. By way of another example, a pattern used for recalibration can allow for more densely sampling a given volume of the workspace 106.

Similar to above, at each position within the workspace 106 at which the end effector is stopped, a sensor calibration point for the position detected by the depth sensor 102 can be collected and an arm calibration point for the position detected by the robotic arm 104 can be collected.

It is contemplated that the calibration component 122 can recalibrate the depth sensor 102 and the robotic arm 104 subsequent to computation of the estimated point that maps to the input point. According to an illustration, the monitor component 126 can receive a measured point from the robotic arm 104. The measured point can include coordinates indicative of the location in the arm coordinate frame detected by the robotic arm 104 (e.g., the location specified by the coordinates of the input point and the coordinates of the estimated point). The monitor component 126 can compute a mapping error based at least in part upon the measured point and the estimated point computed by the interpolation component 120. Further, the monitor component 126 can compare the mapping error to a threshold error value. Responsive to the mapping error being greater than the threshold error value, the monitor component 126 can cause the calibration component 122 to recalibrate the depth sensor 102 and the robotic arm 104. For example, the calibration component 122 can cause a volume of the workspace 106 that includes the location to be resampled or more densely sampled responsive to the mapping error exceeding the threshold error value. Additionally or alternatively, the calibration component 122 can cause the entire workspace 106 to be resampled responsive to the mapping error exceeding the threshold error value.

Pursuant to an example, a number of positions within a given volume of the workspace 106 specified by the pattern can be a function of a mapping error for the given volume. Thus, a volume with a larger mapping error (e.g., larger relative bias) can have more positions at which the pattern causes the end effector to be stopped for collection of sensor calibration points and corresponding arm calibration points as compared to a volume with a lower mapping error (e.g., smaller relative bias); however, the claimed subject matter is not so limited.

To map an input point $w_c$ from the sensor coordinate frame to an estimated point $w'_a$ in the arm coordinate frame, the sample selection component 118 can location a tetrahedron $\tau$ with vertices from $P_c$ that includes $w_c$. The vertices can further be used, along with known correspondences in $P_a$, by the interpolation component 120 to generate the estimated point $w'_a$. As described in greater detail below, the interpolation component 120 can generate the estimated point $w'_a$ using local Procrustes analysis or linear interpolation using barycentric coordinates of $w_c$ in $\tau$.

Figure 4:
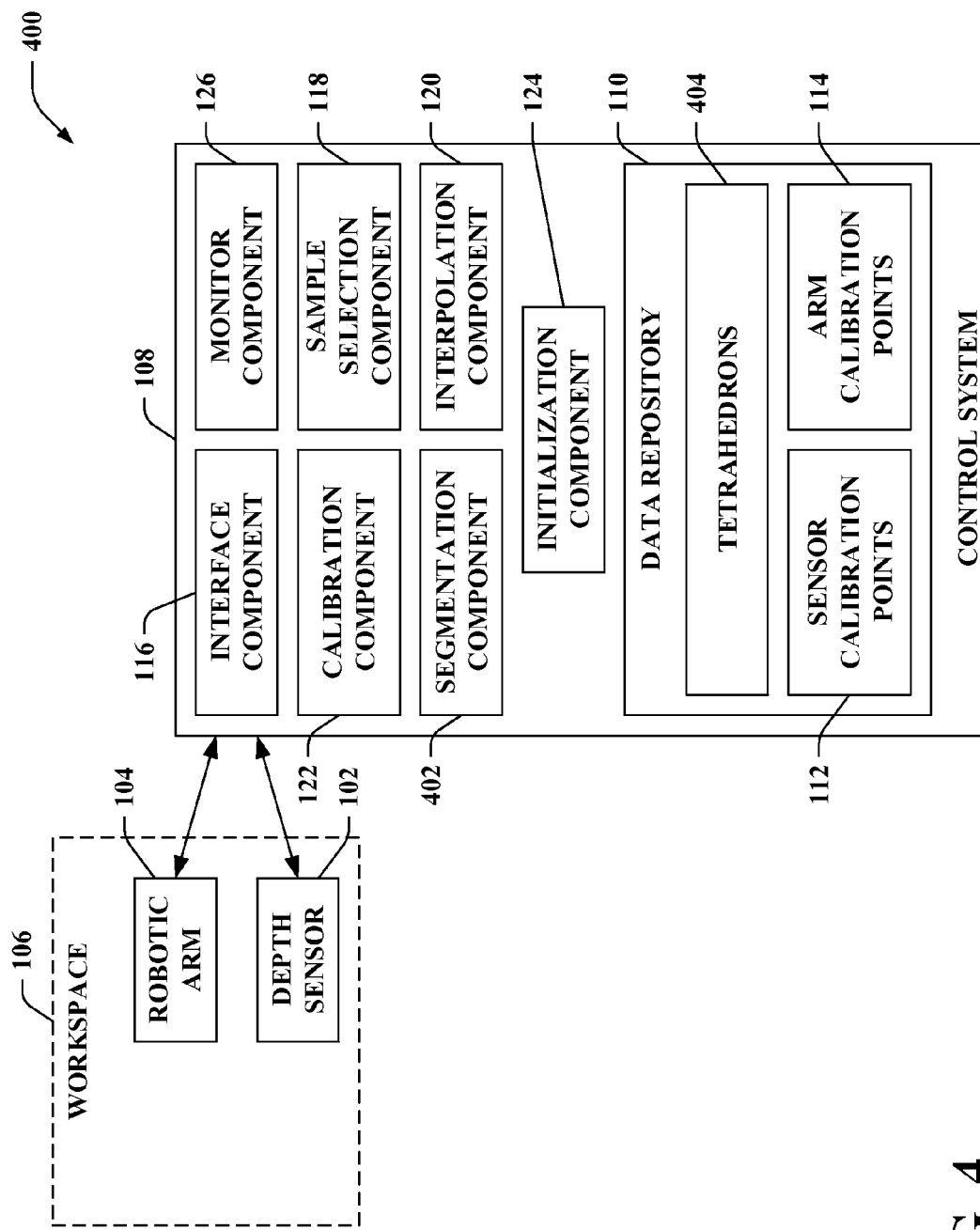
FIG. 4 illustrates a functional block diagram of an exemplary system that includes a control system that controls the depth sensor and the robotic arm during calibration and registration.

Turning to FIG. 4, illustrated is another system 400 that includes the control system 108 that controls the depth sensor 102 and the robotic arm 104 during calibration and registration. The control system 108 can include the interface component 116, the sample selection component 118, the interpolation component 120, the calibration component 122, the initialization component 124, the monitor component 126, and the data repository 110 as described herein. Moreover, the control system 108 can include a segmentation component 402 that forms tetrahedrons using a Delaunay triangulation on the sensor calibration points 112 throughout the workspace 106. Thus, the segmentation component 402 can find the Delaunay triangulation $\Im$ of $P_c$ to form tetrahedrons 404. The tetrahedrons 404 can be retained in the data repository 110.

Figure 5:
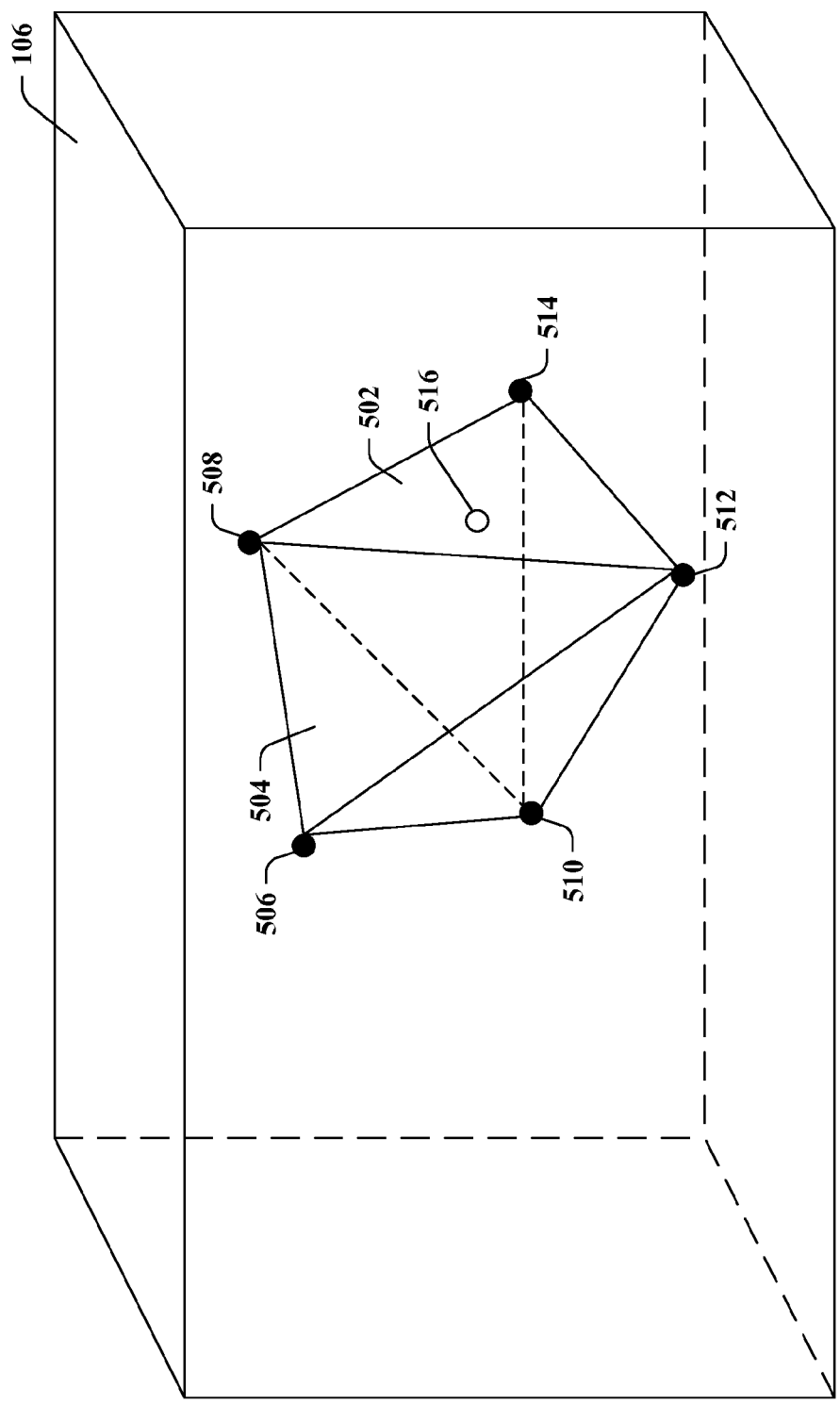
FIG. 5 illustrates an example of tetrahedrons that can be formed using Delaunay triangulation on sensor calibration points in the workspace.

FIG. 5 illustrates an example of tetrahedrons 502-504 that can be formed using Delaunay triangulation on sensor calibration points 506-514 (e.g., the sensor calibration points 112) in the workspace 106. The tetrahedron 502 can include the sensor calibration point 508, the sensor calibration point 510, the sensor calibration point 512, and the sensor calibration point 514 as vertices. The tetrahedron 504 can include the sensor calibration point 506, the sensor calibration point 508, the sensor calibration point 510, and the sensor calibration point 512 as vertices.

As described in greater detail below, the sample selection component 118 can identify sensor calibration points that are within proximity of an input point 516 by identifying a particular tetrahedron that comprises the input point 516. Thus, as depicted, the sample selection component 118 can identify that the input point 516 is within the tetrahedron 502. Further, vertices of the tetrahedron 502 can be identified as being the sensor calibration points within proximity of the input point 516.

Again, reference is made to FIG. 4. According to various embodiments, the control system 108 can employ local Procrustes analysis to compute estimated points that map to input points received by the interface component 116. Local distortions in the depth field can be mitigated by performing Procrustes analysis using data from a neighborhood around the input points to be transformed in the sensor space.

As noted above, the segmentation component 402 can find the Delaunay triangulation $\Im$ of $P_c$. Responsive to the interface component 116 receiving the input point from the depth sensor 102, the sample selection component 118 can identify a particular tetrahedron from the tetrahedrons 404 formed by the segmentation component 402. The particular tetrahedron identified by the sample selection component 118 includes the input point. Accordingly, the sensor calibration points within proximity of the input point identified by the sample selection component 118 are vertices of the particular tetrahedron. Moreover, the sample selection component 118 can identify arm calibration points that respectively correspond to the vertices of the particular tetrahedron. The interpolation component 120 can compute a transformation using Procrustes analysis based upon the vertices of the particular tetrahedron and the arm calibration points that respectively correspond to the vertices of the particular tetrahedron. The transformation can be computed by the interpolation component 120 responsive to receipt of the input point, for example; however, according to other examples, it is contemplated that transformations can be computed prior to receipt of the input point (e.g., responsive to creation of the tetrahedrons 404 by the segmentation component 402, etc.). The interpolation component 120 can further apply the transformation to the input point to compute the estimated point. Thus, to derive the estimate for a point $w_c$ in the arm coordinate frame, the tetrahedron $\tau \in \Im$ that includes $w_c$ can be found by the sample selection component 118, and the interpolation component 120 can perform the Procrustes analysis using the vertices of $\tau$, $\{\tau_1, \tau_2, \tau_3, \tau_4\} \in P_c$, along with corresponding points in $P_a$.

The local Procrustes analysis can be performed by locating a particular tetrahedron in $\Im$, and then performing the Procrustes analysis utilizing vertices of such tetrahedron. The local Procrustes analysis can better handle local distortions in the depth field as compared to global Procrustes analysis. Further, such approach can generally provide a more accurate transformation from a sensor coordinate frame to the arm coordinate frame as compared to the global Procrustes analysis.

According to other embodiments, the control system 108 can employ a Delaunay barycentric technique to compute estimated points that map to input points received by the interface component 116. Again, as set forth above, the segmentation component 402 can find the Delaunay triangulation $\Im$ of $P_c$. Responsive to the interface component 116 receiving the input point from the depth sensor 102, the sample selection component 118 can identify a particular tetrahedron from the tetrahedrons 404 formed by the segmentation component 402. The particular tetrahedron identified by the sample selection component 118 includes the input point. Further, the sensor calibration points within proximity of the input point identified by the sample selection component 118 are vertices of the particular tetrahedron. Moreover, the sample selection component 118 can identify arm calibration points that respectively correspond to the vertices of the particular tetrahedron. The interpolation component 120 can compute barycentric coordinates of the input point with respect to the vertices of the particular tetrahedron. Moreover, the interpolation component 120 can interpolate the estimated point based upon the barycentric coordinates and the arm calibration points that respectively correspond to the vertices of the particular tetrahedron.

Again, reference is made to FIG. 1. According to other embodiments, a combined barycentric interpolation technique can be employed by the control system 108. In accordance with such embodiments, responsive to the interface component 116 receiving the input point from the depth sensor 102, the sample selection component 118 can identify a preset number of the sensor calibration points 112 that are nearest to the input point. Further, the interpolation component 120 can compute the estimated point that maps to the input point by forming one or more tetrahedrons that include the input point. The tetrahedrons can be created with vertices being from the preset number of sensor calibration points nearest to the input point. For each tetrahedron, the interpolation component 120 can compute barycentric coordinates of the input point with respect to vertices of the tetrahedron. The interpolation component 120 can further interpolate a value of the estimated point from the tetrahedron based upon the barycentric coordinates and arm calibration points that respectively correspond to the vertices of the tetrahedron. Moreover, the interpolation component 120 can combine values of the estimated point from the one or more tetrahedrons to compute the estimated point that maps to the input point.

Figure 6:
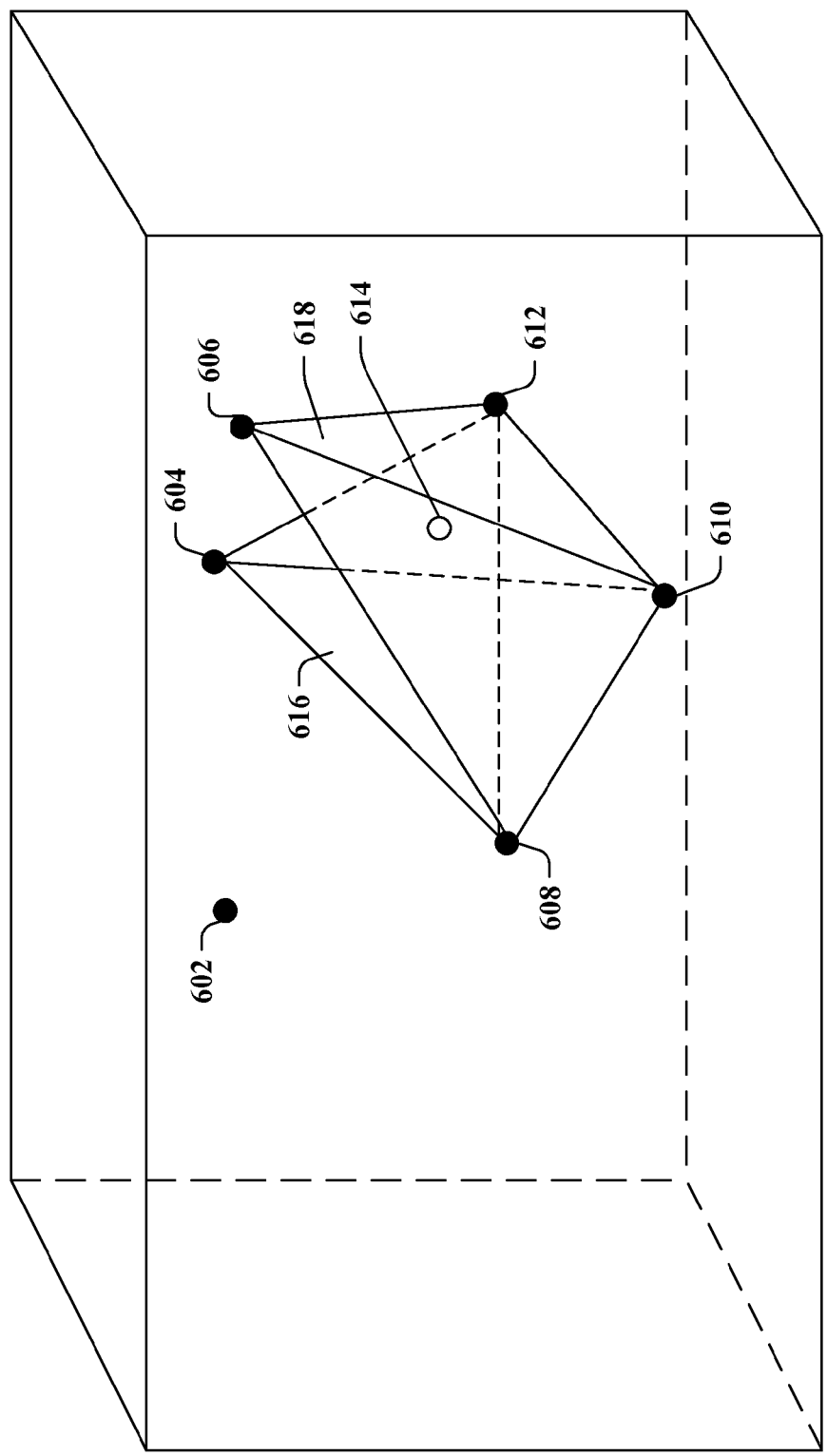
FIG. 6 illustrates an example where a preset number of sensor calibration points nearest to an input point are identified and used to form tetrahedrons that include the input point.

FIG. 6 shows an example where a preset number of sensor calibration points nearest to an input point are identified and used to form tetrahedrons that include the input point. As illustrated, six sensor calibration points 602-612 nearest to an input point 614 are identified by the sample selection component 118. The interpolation component 120 can form a tetrahedron 616 and a tetrahedron 618. The tetrahedron 616 and the tetrahedron 618 can each include the input point 614. For the tetrahedron 616, the interpolation component 120 can compute barycentric coordinates of the input point 614 with respect to the vertices of the tetrahedron 616 (e.g., the sensor calibration point 604, the sensor calibration point 608, the sensor calibration point 610, and the sensor calibration point 612). The interpolation component 120 can further interpolate a value of the estimated point from the tetrahedron 616 based upon the barycentric coordinates and arm calibration points that respectively correspond to the vertices of tetrahedron 616. The interpolation component 120 can similarly compute a value of the estimated point from the tetrahedron 618 (and any disparate tetrahedrons formed from the k nearest sensor calibration points 602-612 that includes the input point 614). Moreover, the interpolation component 120 can combine values of the estimated point from the one or more tetrahedrons (e.g., the tetrahedron 616, the tetrahedron 618, any disparate tetrahedron, etc.) to compute the estimated point that maps to the input point 614.

Reference is again made to FIG. 1. Barycentric coordinates can locate a point on an interior of a simplex (e.g., a triangle, a tetrahedron, etc.) in relation to vertices of that simplex. Homogeneous barycentric coordinates can be normalized so that coordinates inside a simplex sum to 1, and can be used to interpolate function values for points inside a simplex if values of the function are known at the vertices.

As employed herein, homogeneous barycentric coordinates can be used to approximate arm coordinates throughout a convex hull of the sampled volume. Specifically, given a tetrahedron $\tau=\{\tau_1, \tau_2, \tau_3, \tau_4\}$ in the sensor coordinate frame, barycentric coordinates of $w_c$ can be found with respect to vertices $\tau_1, \tau_2, \tau_3$ and $\tau_4$ using the following formula:

$$B_a = \frac{D(w_c, \tau_2, \tau_3, \tau_4)}{D(\tau_1, \tau_2, \tau_3, \tau_4)}$$

$$B_b = \frac{D(\tau_1, w_c, \tau_3, \tau_4)}{D(\tau_1, \tau_2, \tau_3, \tau_4)}$$

$$B_c = \frac{D(\tau_1, \tau_2, w_c, \tau_4)}{D(\tau_1, \tau_2, \tau_3, \tau_4)}$$

$$B_d = \frac{D(\tau_1, \tau_2, \tau_3, w_c)}{D(\tau_1, \tau_2, \tau_3, \tau_4)}$$

In the foregoing, D is defined as the determinant of the following matrix:

$$D(a, b, c, d) = \begin{vmatrix} a \cdot x & a \cdot y & a \cdot z & 1 \\ b \cdot x & b \cdot y & b \cdot z & 1 \\ c \cdot x & c \cdot y & c \cdot z & 1 \\ d \cdot x & d \cdot y & d \cdot z & 1 \end{vmatrix}$$

If all four barycentric coordinates are positive, then $w_c$ is included within $\tau$, and using the arm coordinate values $w_a$ associated with the vertices of $\tau$, the interpolation component 120 can interpolate in the arm frame according to:

$$w'_a \cdot x = B_a * \hat{\tau}_1 \cdot x + B_b * \hat{\tau}_2 \cdot x + B_c * \hat{\tau}_3 \cdot x + B_d * \hat{\tau}_4 \cdot x$$

$$w'_a \cdot y = B_a * \hat{\tau}_1 \cdot y + B_b * \hat{\tau}_2 \cdot y + B_c * \hat{\tau}_3 \cdot y + B_d * \hat{\tau}_4 \cdot y$$

$$w'_a \cdot z = B_a * \hat{\tau}_1 \cdot z + B_b * \hat{\tau}_2 \cdot z + B_c * \hat{\tau}_3 \cdot z + B_d * \hat{\tau}_4 \cdot z$$

In the foregoing, $\hat{\tau}_n$ is the coordinate in the arm coordinate frame that corresponds to $\tau_n$ in the calibration data.

To compensate for possible noise in a training set $P_a$, multiple tetrahedrons can be used. Specifically, given a point $w_c$ in the sensor coordinate frame, $\Omega$ can be constructed which is a set of k nearest neighbors of $w_c$ in $P_c$. This yields a set of candidate vertices from $P_c$ paired with the corresponding points in $P_a$:

$$\Omega = \{\{p_{c1}, p_{a1}\}, \{p_{c2}, p_{a2}\}, \ldots, \{p_{ck}, p_{ak}\}\}$$

Moreover, $\Im$ can be generated, which can include unique tetrahedrons whose vertices are members of $\Omega$ and include $w_c$. Let $w'_{ai}$ be the estimate of $w_c$ in the arm coordinate frame obtained by using the barycentric interpolation of the $i^{th}$ member of $\Im$. The final estimate of $w_c$ can be computed in the arm coordinate frame as $w'_a$ using:

$$w'_a \cdot x = \frac{1}{m} \sum_{i=1}^{m} w'_{ai} \cdot x$$

$$w'_a \cdot y = \frac{1}{m} \sum_{i=1}^{m} w'_{ai} \cdot y$$

$$w'_a \cdot z = \frac{1}{m} \sum_{i=1}^{m} w'_{ai} \cdot z$$

In the above, m is the number of members in $\mathfrak{S}$. The foregoing can be referred to as combined barycentric interpolation.

Further, as described above in connection with the Delaunay barycentric technique, barycentric interpolation inside a single tetrahedron obtained using a Delaunay triangulation of $P_a$ can also be utilized.

In general, barycentric interpolation techniques can enable a computed transformation to be adjusted based on relative proximity to neighboring points, whereas local Procrustes techniques can yield a common transformation for any location in a given tetrahedron in camera space. The barycentric techniques can compute three dimensional positions; however, such techniques may not provide an estimate of rotations between sensor and arm frames. Yet, it is contemplated that barycentric interpolation and Procrustes analysis can be implemented simultaneously by the control system 108.

Figure 7:
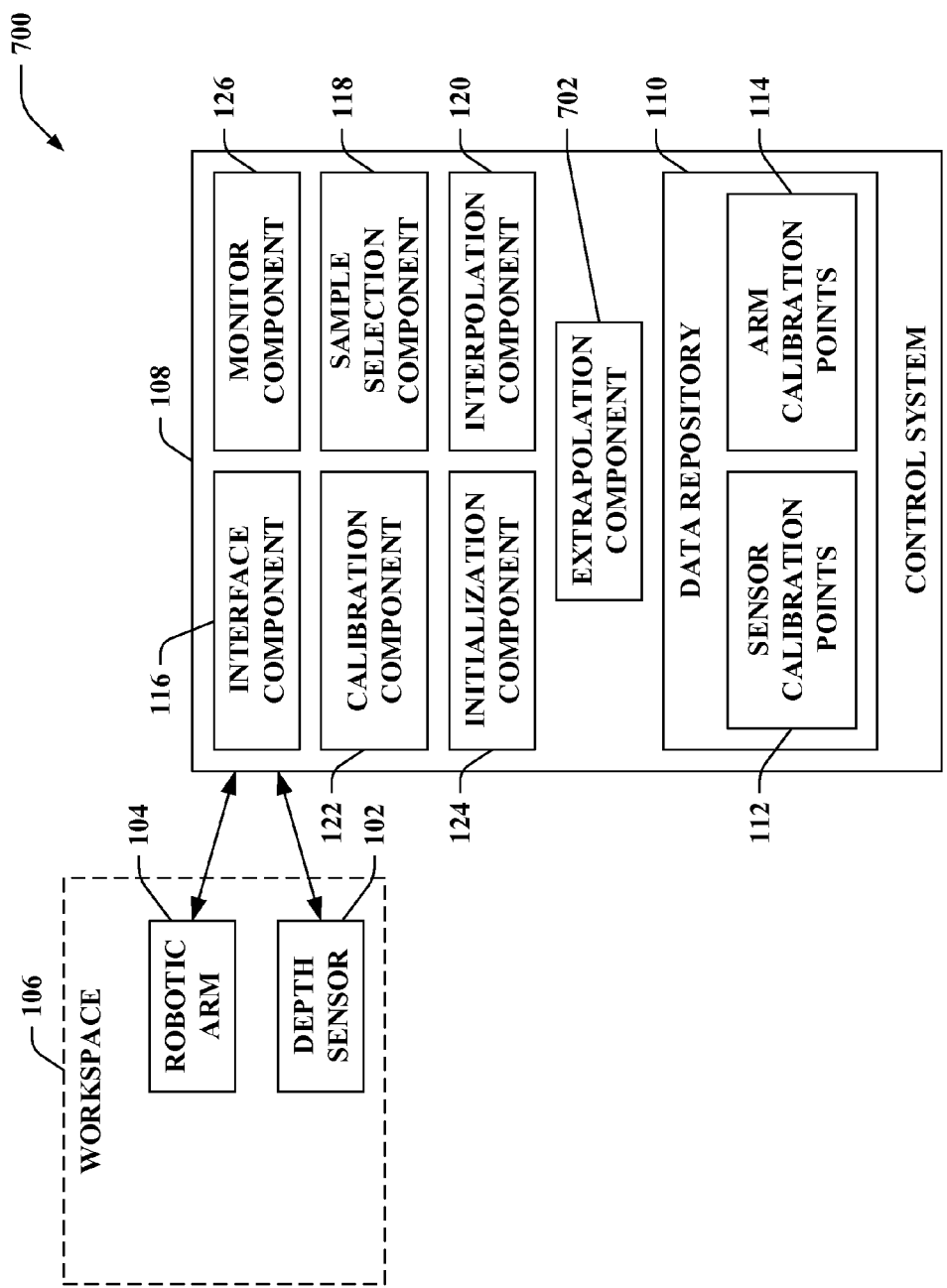
FIG. 7 illustrates a functional block diagram of another exemplary system that includes the control system that controls the depth sensor and the robotic arm during calibration and registration.

Turning to FIG. 7, illustrated is another system 700 that includes the control system 108 that controls the depth sensor 102 and the robotic arm 104 during calibration and registration. The control system 108 can further include an extrapolation component 702 that can use the transformation generated by the initialization component 124 for a given input point, where the initialization component 124 employed the global Procrustes analysis to generate the transformation. More particularly, the given input point can include coordinates indicative of a location in the sensor coordinate frame that is outside a convex hull of the sensor calibration points 112. Thus, the extrapolation component 702 can extrapolate a first estimated point that maps to a first input point using the transformation generated from the global Procrustes analysis if the first input point is outside the convex hull of the sensor calibration points 112, while the interpolation component 120 can interpolate a second estimated point that maps to a second input point using one or more of the techniques described herein if the second input point is within the convex hull of the sensor calibration points 112.

More generally, below is an example of a technique that can be employed by the depth sensor 102 to estimate coordinates of the end effector of the robotic arm 104 in the sensor coordinate frame. As described below, a centroid can be computed based on image moments of a standard deviation image from the depth sensor 102. Moreover, the coordinates of the end effector can be coordinates of the centroid. It is to be appreciated, however, that the claimed subject matter is not limited to the exemplary technique, and other techniques can additionally or alternatively be used by the depth sensor 102. Moreover, it is to be appreciated that at least a portion of the below technique described as being performed by the depth sensor 102 can be performed by the calibration component 122 (or the control system 108 in general).

The depth sensor 102 can employ marker segmentation. To automate the process of calibrating the depth sensor 102 with the robotic arm 104, a marker can be mounted to a tool flange of the robotic arm 104. The marker can allow precise and accurate segmentation of the end effector tip. To ensure that a Cartesian coordinate of the tip is precise, a number of frames can be accumulated by the depth sensor 102 before doing segmentation. Further, since depth readings at edges of objects are usually noisy, image segmentation can be performed and Euclidean coordinates of a centroid can be calculated by the depth sensor 102 in a standard deviation image as opposed to depth frame. The standard deviation image can be a two-dimensional (2D) array of the same dimensions as the depth image (e.g., 512×424 pixels, etc.):

$$\text{StdDevImg}(n,m) = \{S_{01}, S_{02}, \ldots, S_{nm}\}$$

with $S_{ij}$ being a standard deviation estimate of sensor depth readings for a pixel (i,j) computed over N samples.

$$S(i,j) = \sqrt{\frac{1}{N-1} \sum_{k=0}^{N} (x_{i,j,k} - \overline{x}_{i,j})^2}$$

Once the standard deviation image is generated, the depth sensor 102 can filter out depth values that lie outside of a work envelope of interest (e.g., 1.2 m, etc.). Further, the scene can be cleared of objects that may be confused for the marker. The depth sensor 102 can scan the image top down, left to right, looking for a first stable pixel on the scene (e.g., based upon a preset standard deviation threshold, 1.5-2 mm, etc.). Once such pixel is found, the depth sensor 102 can begin scanning its neighborhood, and if enough stable pixels are seen, it can be assumed that the marker has been discovered. Thus, the depth sensor 102 can compute the centroid using image moments:

$$\{\overline{x}, \overline{y}\} = \left\{ \frac{M_{10}}{M_{00}}, \frac{M_{01}}{M_{00}} \right\}$$

In the foregoing, $M_{ij}$ is the first order image moment on standard deviation frame:

$$M_{ij} = \sum_x \sum_y x^i y^j (T - S(x,y))$$

As set forth above, T (e.g., between 2 mm and 5 mm, etc.) is a cutoff threshold for standard deviation of individual pixels; above the cutoff threshold, a pixel is not included in calculating the image moments. Negating values of standard deviation can have the effect of assigning higher weights to pixels with stable depth readings. Accordingly, X and Y coordinates for the centroid of the marker can be computed.

To compute a Z coordinate (depth), the depth sensor 102 can average a region of pixels (e.g., 3×3 or 5×5) around X and Y and record an average depth. Thus, an estimated 3D coordinate for the tip of the end effector can be computed.

$$C_k = \{X_k, Y_k, Z_k\}$$

Moreover, since the marker dimensions can be known, Cartesian coordinates of a common point in the arm coordinate frame can be obtained based on its kinematic model:

$$C_a = \{X_a, Y_a, Z_a\}$$

Both sets of coordinates can be recorded as a linked pair in the data repository 110. Repeating this process n times, two sets of n matching 3D points can be collected and retained in the data repository 110 (one from the depth sensor 102 and one from the robotic arm 104).

$$V(n)=\{\{C_{k1},C_{a1}\},\{C_{k2},C_{a2}\},\ldots,\{C_{kn},C_{an}\}\}$$

Conventional approaches for calibrating optical sensors (e.g., depth sensors) oftentimes include calibrating both intrinsic parameters, such as scale and skew of image plane axes as well as lens distortion, and extrinsic parameters, such as a spatial transformation between frames. Traditional approaches may be performed by decomposing estimation of intrinsics and extrinsics, or the calibrations may be combined. In contrast, the techniques set forth herein enable automatic discovery of a translation function between a sensor coordinate frame and an arm coordinate frame without separate pre-calibration of the depth sensor.

Figure 8:
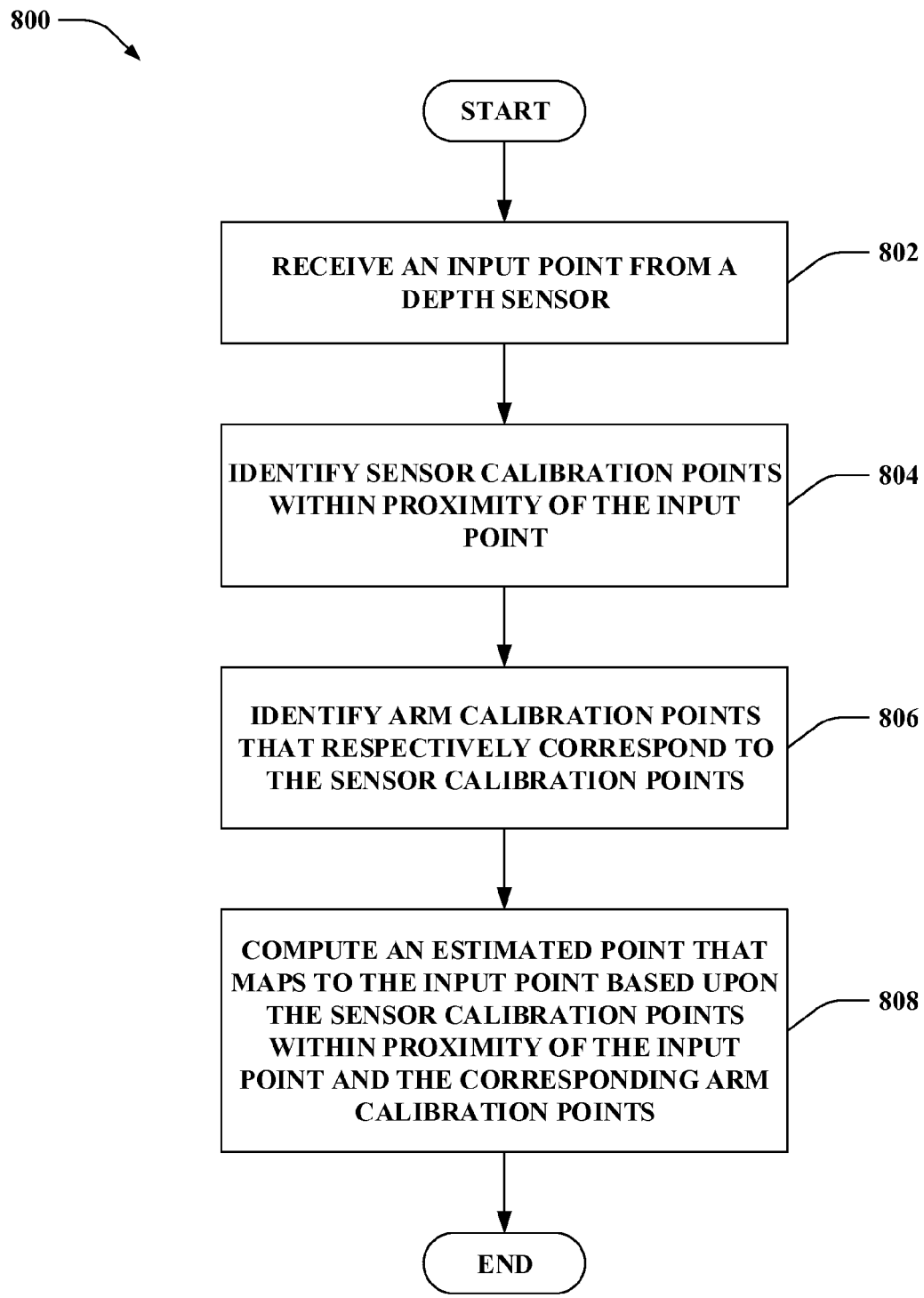
FIG. 8 is a flow diagram that illustrates an exemplary methodology of controlling a depth sensor and a robotic arm that operate in the workspace.
Figure 9:
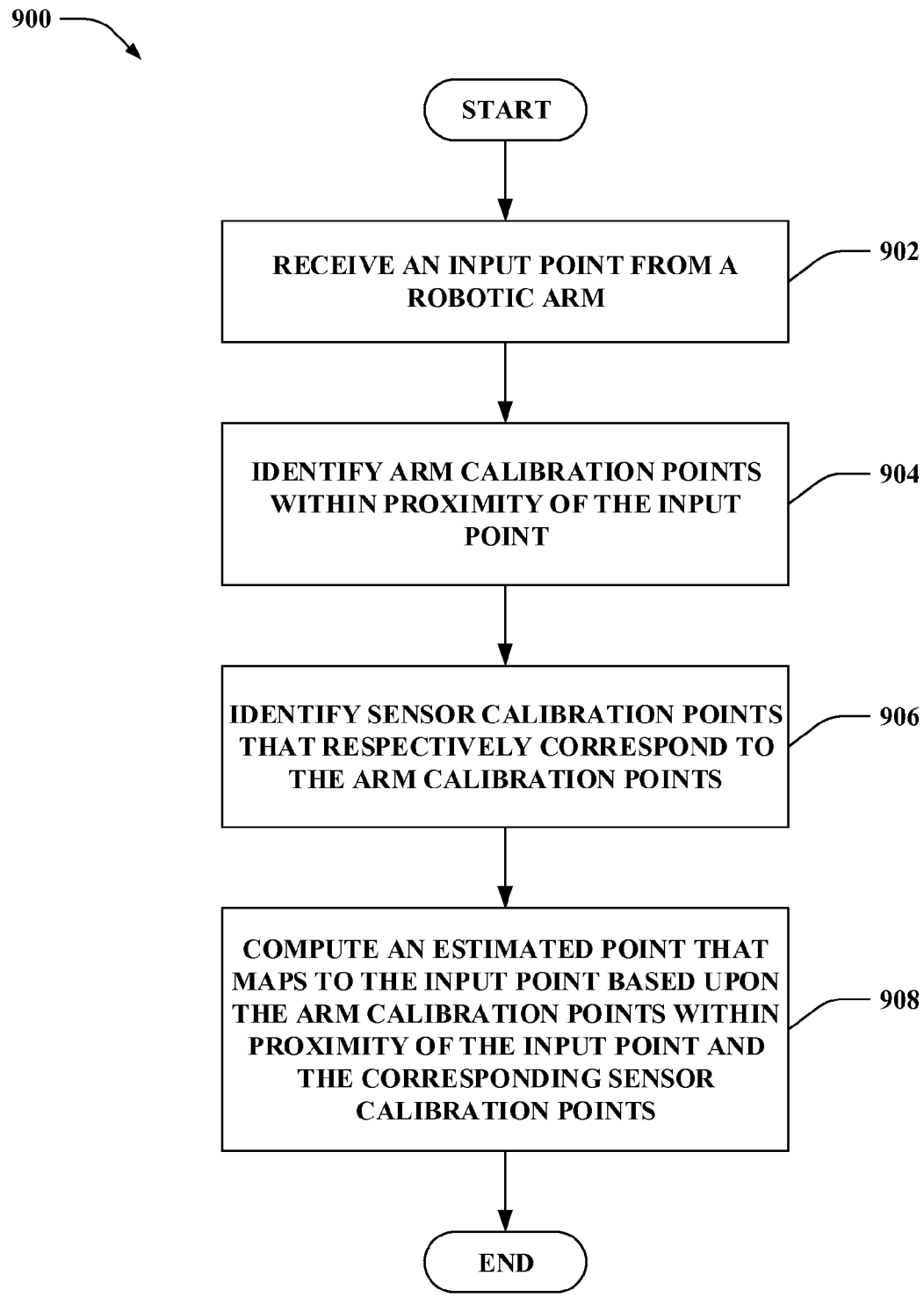
FIG. 9 is a flow diagram that illustrates an exemplary methodology of controlling the depth sensor and the robotic arm that operate in the workspace.

FIGS. 8-9 illustrate exemplary methodologies relating to controlling a depth sensor and a robotic arm that operate in the workspace. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 8 illustrates a methodology 800 of controlling a depth sensor and a robotic arm that operate in the workspace. The robotic arm can include an end effector. At 802, an input point can be received from the depth sensor. The input point includes coordinates indicative of a location in a sensor coordinate frame, where the location is in the workspace. At 804, sensor calibration points within proximity of the input point can be identified. A sensor calibration point includes first coordinates of the end effector in the sensor coordinate frame, the first coordinates being previously collected during calibration (e.g., recalibration) with the end effector at a given position within the workspace. At 806, arm calibration points that respectively correspond to the sensor calibration points can be identified. An arm calibration point that corresponds to the sensor calibration point includes second coordinates of the end effector in an arm coordinate frame. Further, the second coordinates are previously collected during the calibration (e.g., recalibration) with the end effector at the given position within the workspace. At 808, a processor can be employed to compute an estimated point that maps to the input point. The estimated point can include coordinates indicative of the location in the arm coordinate frame. The estimated point can be computed based upon the sensor calibration points (e.g., the sensor calibration points within proximity of the input point) and the arm calibration points (e.g., the arm calibration points that respectively correspond to the sensor calibration points within proximity of the input point).

With reference to FIG. 9, illustrated is another methodology 900 of controlling the depth sensor and the robotic arm that operate in the workspace. Again, the robotic arm can include an end effector. At 902, an input point can be received from the robotic arm. The input point can include coordinates indicative of the location in an arm coordinate frame, where the location is in the workspace. At 904, arm calibration points within proximity of the input point can be identified. An arm calibration point can include first coordinates of the end effector in the arm coordinate frame. The first coordinates are previously collected during calibration (e.g., recalibration) with the end effector at a given position within the workspace. At 906, sensor calibration points that respectively correspond to the arm calibration points can be identified. A sensor calibration point that corresponds to the arm calibration point can include second coordinates of the end effector in a sensor coordinate frame, the second coordinates being previously collected during the calibration (e.g., recalibration) with the end effector at the given position within the workspace. At 908, a processor can be employed to compute an estimated point that maps to the input point. The estimated point can include coordinates indicative of the location in the sensor coordinate frame. The estimated point can be computed based upon the arm calibration points (e.g., the arm calibration points within proximity of the input point) and the sensor calibration points (e.g., the sensor calibration points that respectively corresponding to the arm calibration points within proximity of the input point).

Various examples are now set forth.

Example 1

A method of controlling a depth sensor and a robotic arm that operate in a workspace, the robotic arm comprises an end effector, the method comprising: receiving an input point from the depth sensor, the input point comprises coordinates indicative of a location in a sensor coordinate frame, the location being in the workspace; identifying sensor calibration points within proximity of the input point, a sensor calibration point comprises first coordinates of the end effector in the sensor coordinate frame, the first coordinates previously collected during calibration with the end effector at a given position within the workspace; identifying arm calibration points that respectively correspond to the sensor calibration points, an arm calibration point that corresponds to the sensor calibration point comprises second coordinates of the end effector in an arm coordinate frame, the second coordinates previously collected during the calibration with the end effector at the given position within the workspace; and employing a processor to compute an estimated point that maps to the input point, the estimated point comprises coordinates indicative of the location in the arm coordinate frame, the estimated point computed based upon: the sensor calibration points; and the arm calibration points.

Example 2

The method according to Example 1, further comprising performing the calibration, performance of the calibration comprises: causing the end effector to non-continuously traverse through the workspace based on a pattern, wherein the end effector is stopped at positions within the workspace according to the pattern; and at each position from the positions within the workspace at which the end effector is stopped: collecting a sensor calibration point for the position of the end effector within the workspace detected by the depth sensor, the sensor calibration point for the position comprises coordinates of the end effector at the position within the workspace in the sensor coordinate frame; and collecting an arm calibration point for the position of the end effector within the workspace detected by the robotic arm, the arm calibration point for the position comprises coordinates of the end effector at the position within the workspace in the arm coordinate frame.

Example 3

The method according to Example 2, further comprising computing a centroid based on image moments of a standard deviation image from the depth sensor, the coordinates of the sensor calibration point being coordinates of the centroid.

Example 4

The method according to any of Examples 1-3, further comprising recalibrating the depth sensor and the robotic arm subsequent to computing the estimated point that maps to the input point, recalibration further comprises: causing the end effector to non-continuously traverse through the workspace based on a pattern, wherein the end effector is stopped at positions within the workspace according to the pattern; and at each position from the positions within the workspace at which the end effector is stopped: collecting a sensor calibration point for the position of the end effector within the workspace detected by the depth sensor, the sensor calibration point for the position comprises coordinates of the end effector at the position within the workspace in the sensor coordinate frame; and collecting an arm calibration point for the position of the end effector within the workspace detected by the robotic arm, the arm calibration point for the position comprises coordinates of the end effector at the position within the workspace in the arm coordinate frame.

Example 5

The method according to Example 4, further comprising: receiving a measured point from the robotic arm, the measured point comprises coordinates indicative of the location in the arm coordinate frame detected by the robotic arm; computing a mapping error based at least in part upon the measured point and the estimated point; comparing the mapping error to a threshold error value; and responsive to the mapping error being greater than the threshold error value, recalibrating the depth sensor and the robotic arm.

Example 6

The method according to Example 4, wherein a number of positions within a given volume of the workspace specified by the pattern is a function of a mapping error for the given volume.

Example 7

The method according to any of Examples 1-6, further comprising: creating tetrahedrons using a Delaunay triangulation on sensor calibration points collected throughout the workspace, the sensor calibration points collected throughout the workspace comprise: the sensor calibration points within proximity of the input point; and at least one disparate sensor calibration point outside proximity of the input point.

Example 8

The method according to any of Examples 1-7, wherein identifying the sensor calibration points within proximity of the input point further comprises: identifying a particular tetrahedron from the tetrahedrons, the particular tetrahedron comprises the input point, the sensor calibration points within proximity of the input point being vertices of the particular tetrahedron.

Example 9

The method according to any of Examples 1-8, wherein computing the estimated point that maps to the input point further comprises: computing a transformation using Procrustes analysis based upon: the vertices of the particular tetrahedron; and the arm calibration points, wherein the arm calibration points respectively correspond to the vertices of the particular tetrahedron; and applying the transformation to the input point to compute the estimated point.

Example 10

The method according to any of Examples 1-8, wherein computing the estimated point that maps to the input point further comprises: computing barycentric coordinates of the input point with respect to the vertices of the particular tetrahedron; and interpolating the estimated point based upon the barycentric coordinates and the arm calibration points, wherein the arm calibration points respectively correspond to the vertices of the particular tetrahedron.

Example 11

The method according to any of Examples 1-10, wherein: identifying the sensor calibration points within proximity of the input point further comprises: identifying a preset number of sensor calibration points nearest to the input point; and computing the estimated point that maps to the input point further comprises: creating one or more tetrahedrons that comprise the input point, the tetrahedrons created with vertices being from the preset number of sensor calibration points nearest to the input point; for each tetrahedron of the one or more tetrahedrons: computing barycentric coordinates of the input point with respect to vertices of the tetrahedron; and interpolating a value of the estimated point from the tetrahedron based upon the barycentric coordinates and arm calibration points that respectively correspond to the vertices of the tetrahedron; and combining values of the estimated point from the one or more tetrahedrons to compute the estimated point that maps to the input point.

Example 12

The method according to any of Examples 1-11, further comprising: receiving a disparate input point from the robotic arm, the disparate input point comprises coordinates indicative of a disparate location in the arm coordinate frame, the disparate location being in the workspace; identifying disparate arm calibration points within proximity of the disparate input point; identifying disparate sensor calibration points that respectively correspond to the disparate arm calibration points; and employing the processor to compute a disparate estimated point that maps to the disparate input point, the disparate estimated point comprises coordinates indicative of the disparate location in the sensor coordinate frame, the disparate estimated point computed based upon: the disparate arm calibration points; and the disparate sensor calibration points.

Example 13

A system that controls a depth sensor and a robotic arm that operate in a workspace, the robotic arm comprises an end effector, the system comprises: a data repository, the data repository retains: sensor calibration points throughout the workspace, a sensor calibration point comprises first coordinates of the end effector in a sensor coordinate frame, the first coordinates previously collected during calibration with the end effector at a given position within the workspace; and arm calibration points throughout the workspace, the arm calibration points respectively correspond to the sensor calibration points, an arm calibration point that corresponds to the sensor calibration point comprises second coordinates of the end effector in an arm coordinate frame, the second coordinates previously collected during the calibration with the end effector at the given position within the workspace; an interface component that receives an input point from the depth sensor, the input point comprises coordinates indicative of a location in the sensor coordinate frame, the location being in the workspace; a sample selection component that: identifies sensor calibration points within proximity of the input point from the data repository; and identifies arm calibration points that respectively correspond to the sensor calibration points within proximity of the input point from the data repository; and an interpolation component that computes an estimated point that maps to the input point, the estimated point comprises coordinates indicative of the location in the arm coordinate frame, the estimated point computed based upon: the sensor calibration points within proximity of the input point; and the arm calibration points that respectively correspond to the sensor calibration points within proximity of the input point.

Example 14

The system according to Example 13, further comprising a calibration component that performs the calibration, the calibration component: causes the end effector to non-continuously traverse through the workspace based on a pattern, wherein the end effector is stopped at positions within the workspace according to the pattern; and at each position from the positions within the workspace at which the end effector is stopped: collects a sensor calibration point for the position of the end effector within the workspace detected by the depth sensor, the sensor calibration point for the position comprises coordinates of the end effector at the position within the workspace in the sensor coordinate frame; stores the sensor calibration point for the position in the data repository; collects an arm calibration point for the position of the end effector within the workspace detected by the robotic arm, the arm calibration point for the position comprises coordinates of the end effector at the position within the workspace in the arm coordinate frame; and stores the arm calibration point for the position in the data repository.

Example 15

The system according to Example 14, further comprising a monitor component that monitors conditions of the depth sensor, the robotic arm, and the workspace, wherein the calibration component selectively initiates recalibration based upon the conditions.

Example 16

The system according to any of Examples 13-15, further comprising a segmentation component that forms tetrahedrons using a Delaunay triangulation on the sensor calibration points throughout the workspace.

Example 17

The system according to Example 16, wherein: the sample selection component: identifies a particular tetrahedron from the tetrahedrons formed by the segmentation component, the particular tetrahedron comprises the input point, the sensor calibration points within proximity of the input point being vertices of the particular tetrahedron; and identifies arm calibration points that respectively correspond to the vertices of the particular tetrahedron; and the interpolation component: computes a transformation using Procrustes analysis based upon: the vertices of the particular tetrahedron; and the arm calibration points that respectively corresponding to the vertices of the particular tetrahedron; and applies the transformation to the input point to compute the estimated point.

Example 18

The system according to Example 16, wherein: the sample selection component: identifies a particular tetrahedron from the tetrahedrons formed by the segmentation component, the particular tetrahedron comprises the input point, the sensor calibration points within proximity of the input point being vertices of the particular tetrahedron; and identifies arm calibration points that respectively correspond to the vertices of the particular tetrahedron; and the interpolation component: computes barycentric coordinates of the input point with respect to the vertices of the particular tetrahedron; and interpolates the estimated point based upon the barycentric coordinates and the arm calibration points that respectively correspond to the vertices of the particular tetrahedron.

Example 19

The system according to any of Examples 13-18, wherein: the sample selection component identifies a preset number of sensor calibration points nearest to the input point; and the interpolation component: forms one or more tetrahedrons that comprise the input point, the tetrahedrons created with vertices being from the preset number of sensor calibration points nearest to the input point; for each tetrahedron of the one or more tetrahedrons: computes barycentric coordinates of the input point with respect to vertices of the tetrahedron; and interpolates a value of the estimated point from the tetrahedron based upon the barycentric coordinates and arm calibration points that respectively correspond to the vertices of the tetrahedron; and combines values of the estimated point from the one or more tetrahedrons to compute the estimated point that maps to the input point.

Example 20

A method of controlling a depth sensor and a robotic arm that operate in a workspace, the robotic arm comprises an end effector, the method comprising: receiving an input point from the robotic arm, the input point comprises coordinates indicative of a location in an arm coordinate frame, the location being in the workspace; identifying arm calibration points within proximity of the input point, an arm calibration point comprises first coordinates of the end effector in the arm coordinate frame, the first coordinates previously collected during calibration with the end effector at a given position within the workspace; identifying sensor calibration points that respectively correspond to the arm calibration points, a sensor calibration point that corresponds to the arm calibration point comprises second coordinates of the end effector in a sensor coordinate frame, the second coordinates previously collected during the calibration with the end effector at the given position within the workspace; and employing a processor to compute an estimated point that maps to the input point, the estimated point comprises coordinates indicative of the location in the sensor coordinate frame, the estimated point computed based upon: the arm calibration points; and the sensor calibration points.

Example 21

A system of controlling a depth sensor and a robotic arm that operate in a workspace, the robotic arm comprises an end effector, the system comprising: means for receiving an input point from the depth sensor, the input point comprises coordinates indicative of a location in a sensor coordinate frame, the location being in the workspace; means for identifying sensor calibration points within proximity of the input point, a sensor calibration point comprises first coordinates of the end effector in the sensor coordinate frame, the first coordinates previously collected during calibration with the end effector at a given position within the workspace; means for identifying arm calibration points that respectively correspond to the sensor calibration points, an arm calibration point that corresponds to the sensor calibration point comprises second coordinates of the end effector in an arm coordinate frame, the second coordinates previously collected during the calibration with the end effector at the given position within the workspace; and means for computing an estimated point that maps to the input point, the estimated point comprises coordinates indicative of the location in the arm coordinate frame, the estimated point computed based upon: the sensor calibration points; and the arm calibration points.

Figure 10:
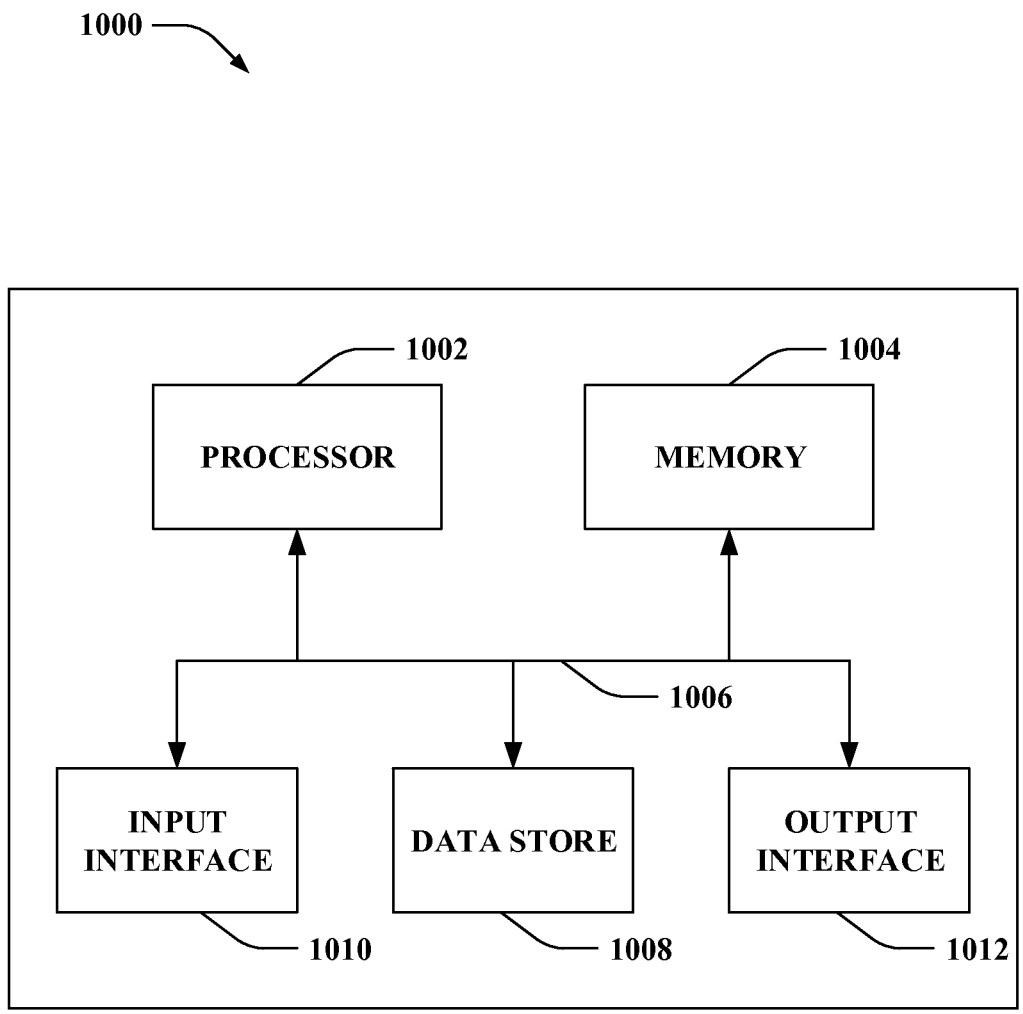
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be used in a system that controls calibration and/or registration of a depth sensor and a robotic arm operating in a workspace. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store sensor calibration points, arm calibration points, transformation functions, tetrahedrons, and so forth.

The computing device 1000 additionally includes a data store 1008 that is accessible by the processor 1002 by way of the system bus 1006. The data store 1008 may include executable instructions, sensor calibration points, arm calibration points, transformation functions, tetrahedrons, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of controlling a depth sensor and a robotic arm, the depth sensor and the robotic arm operate in a workspace, the robotic arm comprises an end effector, the method comprising:
   monitoring the depth sensor, the robotic arm, and the workspace for a condition indicative of the depth sensor and the robotic arm being out of calibration;
   selectively initiating sampling of calibration points for the depth sensor and the robotic arm in the workspace responsive to the condition being detected, wherein detection of the condition indicative of the depth sensor and the robotic arm being out of calibration causes the sampling of the calibration points for the depth sensor and the robotic arm in the workspace to be performed; and
   when initiated responsive to the condition being detected, the sampling of the calibration points for the depth sensor and the robotic arm in the workspace comprises:
      employing a control system to control movement of the robotic arm, the robotic arm being moved to cause the end effector of the robotic arm to non-continuously traverse through the workspace based on a pattern, wherein the end effector is stopped at positions within the workspace specified by the pattern; and
      at each position from the positions within the workspace at which the end effector is stopped:
         collecting a sensor calibration point for the position of the end effector within the workspace detected by the depth sensor, the sensor calibration point for the position comprises coordinates of the end effector at the position within the workspace in a sensor coordinate frame; and
         collecting an arm calibration point for the position of the end effector within the workspace detected by the robotic arm, the arm calibration point for the position comprises coordinates of the end effector at the position within the workspace in an arm coordinate frame.

2. The method of claim 1, further comprising:
   detecting mapping errors within the workspace; and
   identifying a number and placement of the positions within the workspace for the pattern based on the mapping errors within the workspace.

3. The method of claim 1, wherein the pattern specifies a predetermined number and placement of the positions within the workspace.

4. The method of claim 1, wherein the condition indicative of the depth sensor and the robotic arm being out of calibration comprises movement of the depth sensor in the workspace, the method further comprising:
   detecting the movement of the depth sensor in the workspace that causes the depth sensor and the robotic arm to be out of calibration;
   wherein, responsive to detection of the movement of the depth sensor in the workspace that causes the depth sensor and the robotic arm to be out of calibration, the end effector of the robotic arm is caused to non-continuously traverse through the workspace based on the pattern, sensor calibration points are collected for the positions within the workspace specified by the pattern, and arm calibration points are collected for the positions within the workspace specified by the pattern.

5. The method of claim 1, wherein the condition indicative of the depth sensor and the robotic arm being out of calibration comprises movement of the robotic arm in the workspace, the method further comprising:
   detecting the movement of the robotic arm in the workspace that causes the depth sensor and the robotic arm to be out of calibration;
   wherein, responsive to detection of the movement of the robotic arm in the workspace that causes the depth sensor and the robotic arm to be out of calibration, the end effector of the robotic arm is caused to non-continuously traverse through the workspace based on the pattern, sensor calibration points are collected for the positions within the workspace specified by the pattern, and arm calibration points are collected for the positions within the workspace specified by the pattern.

6. The method of claim 1, wherein the condition indicative of the depth sensor and the robotic arm being out of calibration comprises a temperature change in the workspace that exceeds a threshold temperature change, the method further comprising:
   detecting the temperature change in the workspace that exceeds the threshold temperature change;
   wherein, responsive to detection of the temperature change in the workspace that exceeds the threshold temperature change, the end effector of the robotic arm is caused to non-continuously traverse through the workspace based on the pattern, sensor calibration points are collected for the positions within the workspace specified by the pattern, and arm calibration points are collected for the positions within the workspace specified by the pattern.

7. The method of claim 1, wherein the condition indicative of the depth sensor and the robotic arm being out of calibration comprises a mapping error that exceeds a threshold error value, the method further comprising:
   detecting the mapping error that exceeds the threshold error value;

wherein, responsive to detection of the mapping error that exceeds the threshold error value, the end effector of the robotic arm is caused to non-continuously traverse through the workspace based on the pattern, sensor calibration points are collected for the positions within the workspace specified by the pattern, and arm calibration points are collected for the positions within the workspace specified by the pattern.

8. The method of claim 1, further comprising:
periodically verifying calibration of the robotic arm and the depth sensor in the workspace.

9. The method of claim 1, further comprising:
verifying calibration of the robotic arm and the depth sensor in the workspace prior to the robotic arm and the depth sensor performing a task.

10. The method of claim 1, wherein the depth sensor and the robotic arm are calibrated in-situ in the workspace.

11. The method of claim 1, further comprising forming tetrahedrons based on sensor calibration points throughout the workspace.

12. The method of claim 1, further comprising:
performing an interpolation to map an input point to an estimated point, the input point being from the depth sensor, the input point comprises coordinates indicative of a location in the sensor coordinate frame, the location being in the workspace, the estimated point comprises coordinates indicative of the location in the arm coordinate frame, and the interpolation being performed based on:
a subset of sensor calibration points collected for the positions within the workspace specified by the pattern; and
a subset of arm calibration points collected for the positions within the workspace specified by the pattern.

13. The method of claim 1, further comprising:
performing an interpolation to map an input point to an estimated point, the input point being from the robotic arm, the input point comprises coordinates indicative of a location in the arm coordinate frame, the location being in the workspace, the estimated point comprises coordinates indicative of the location in the sensor coordinate frame, and the interpolation being performed based on:
a subset of sensor calibration points collected for the positions within the workspace specified by the pattern; and
a subset of arm calibration points collected for the positions within the workspace specified by the pattern.

14. A control system configured to control a depth sensor and a robotic arm, the depth sensor and the robotic arm operate in a workspace, the robotic arm comprises an end effector, the control system comprising:
at least one processor; and
memory that comprises computer-executable instructions that, when executed by the at least one processor, cause the at least one processor to perform acts including:
monitoring at least one of the depth sensor, the robotic arm, and the workspace for a condition indicative of the depth sensor and the robotic arm being out of calibration; and
selectively initiating sampling of calibration points for the depth sensor and the robotic arm in the workspace responsive to the condition being detected, wherein detection of the condition indicative of the depth sensor and the robotic arm being out of calibration causes the sampling of the calibration points for the depth sensor and the robotic arm in the workspace to be performed; and
when initiated responsive to the condition being detected, the sampling of the calibration points for the depth sensor and the robotic arm in the workspace comprises:
controlling movement of the robotic arm, the robotic arm being moved to cause the end effector of the robotic arm to non-continuously traverse through the workspace based on a pattern, wherein the end effector is stopped at positions within the workspace specified by the pattern;
collecting sensor calibration points for the positions of the end effector within the workspace detected by the depth sensor, the sensor calibration points for the positions comprise respective coordinates of the end effector at the positions within the workspace in a sensor coordinate frame; and
collecting arm calibration points for the positions of the end effector within the workspace detected by the robotic arm, the arm calibration points for the positions comprise respective coordinates of the end effector at the positions within the workspace in an arm coordinate frame.

15. The control system of claim 14, the memory further comprising computer-executable instructions that, when executed by the at least one processor, cause the at least one processor to perform acts including:
generating a coordinate frame transformation function for mapping coordinates between the sensor coordinate frame and the arm coordinate frame, the coordinate frame transformation function being generated based on the sensor calibration points and the arm calibration points.

16. The control system of claim 15, the memory further comprising computer-executable instructions that, when executed by the at least one processor, cause the at least one processor to perform acts including:
receiving an input point from the depth sensor, the input point comprises coordinates indicative of a location in the sensor coordinate frame, the location being in the workspace; and
applying the coordinate frame transformation function to the input point to output an estimated point that maps to the input point, the estimated point comprises coordinates indicative of the location in the arm coordinate frame.

17. The control system of claim 15, wherein the coordinate frame transformation function compensates for distortion in a depth field of the depth sensor.

18. The control system of claim 14, the control system being configured to transmit data to and receive data from the depth sensor and the robotic arm over a network.

19. The control system of claim 14, wherein the depth sensor is one of a structured light three-dimensional (3D) scanner, a time-of-flight scanner, or a modulated light 3D scanner.

20. A control system configured to control a depth sensor and a robotic arm, the depth sensor and the robotic arm operate in a workspace, the robotic arm comprises an end effector, the control system comprising:
at least one processor; and
memory that comprises computer-executable instructions that, when executed by the at least one processor, cause the at least one processor to perform acts including:

collecting sensor calibration points for positions of the end effector within the workspace detected by the depth sensor during calibration, the calibration being initiated responsive to detection of a condition indicative of the depth sensor and the robotic arm falling out of calibration, the sensor calibration points for the positions comprise respective coordinates of the end effector at the positions within the workspace in a sensor coordinate frame;

collecting arm calibration points for the positions of the end effector within the workspace detected by the robotic arm during the calibration, the arm calibration points for the positions comprise respective coordinates of the end effector at the positions within the workspace in an arm coordinate frame;

generating a coordinate frame transformation function for mapping coordinates between the sensor coordinate frame and the arm coordinate frame, the coordinate frame transformation function being generated based on the sensor calibration points and the arm calibration points;

receiving an input point from the depth sensor, the input point comprises coordinates indicative of a location in the sensor coordinate frame, the location being in the workspace; and applying the coordinate frame transformation function to the input point to output an estimated point that maps to the input point, the estimated point comprises coordinates indicative of the location in the arm coordinate frame.

\* \* \* \* \*